United States Patent
Yi et al.

(10) Patent No.: US 12,363,724 B2
(45) Date of Patent: *Jul. 15, 2025

(54) METHOD AND APPARATUS FOR CONFIGURING SUBBAND AGGREGATION IN NR CARRIER IN WIRELESS COMMUNICATION SYSTEM

(71) Applicant: LG Electronics Inc., Seoul (KR)

(72) Inventors: Yunjung Yi, Seoul (KR); Kijun Kim, Seoul (KR); Byounghoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 287 days.

This patent is subject to a terminal disclaimer.

(21) Appl. No.: 17/685,124

(22) Filed: Mar. 2, 2022

(65) Prior Publication Data
US 2022/0191844 A1    Jun. 16, 2022

Related U.S. Application Data

(63) Continuation of application No. 16/936,962, filed on Jul. 23, 2020, now Pat. No. 11,317,397, which is a
(Continued)

(51) Int. Cl.
*H04W 72/23* (2023.01)
*H04L 5/00* (2006.01)
*H04W 72/0453* (2023.01)

(52) U.S. Cl.
CPC ............. *H04W 72/23* (2023.01); *H04L 5/001* (2013.01); *H04L 5/0037* (2013.01);
(Continued)

(58) Field of Classification Search
CPC ...... H04W 72/23; H04L 5/001; H04L 5/0044; H04L 5/0057; H04L 5/0094
See application file for complete search history.

(56) References Cited

U.S. PATENT DOCUMENTS 10,743,299 B2 * 8/2020 Yi ................... H04W 72/0453
10,945,276 B2   3/2021 Liu et al.
(Continued)

FOREIGN PATENT DOCUMENTS

CN         103999528         8/2014
CN         104969490         10/2015
(Continued)

OTHER PUBLICATIONS

AT&T, "Initial Access and Mobility Requirements for NR," 3GPP TSG RAN1 Meeting #86bis, R1-1609387, Oct. 10-14, 2016, 8 pages.
(Continued)

*Primary Examiner* — Siming Liu
(74) *Attorney, Agent, or Firm* — Fish & Richardson P.C.

(57) ABSTRACT

A method and apparatus for configuring a data subband in a wireless communication system is provided. A user equipment (UE) receives an indication of a data subband from a network, configures at least one data subband according to the indication, and performs communication with the network via the at least one data subband. One data subband consists of contiguous or noncontiguous physical resource blocks (PRBs).

19 Claims, 25 Drawing Sheets

Related U.S. Application Data continuation of application No. 16/064,936, filed as application No. PCT/KR2017/012255 on Nov. 1, 2017, now Pat. No. 10,743,299.

(60) Provisional application No. 62/492,935, filed on May 1, 2017, provisional application No. 62/457,802, filed on Feb. 10, 2017, provisional application No. 62/452,393, filed on Jan. 31, 2017, provisional application No. 62/417,449, filed on Nov. 4, 2016, provisional application No. 62/416,108, filed on Nov. 1, 2016.

(52) U.S. Cl.
CPC .......... *H04L 5/0039* (2013.01); *H04L 5/0041* (2013.01); *H04L 5/0044* (2013.01); *H04L 5/0057* (2013.01); *H04L 5/0094* (2013.01); *H04L 5/0098* (2013.01); *H04W 72/0453* (2013.01); *H04L 5/0007* (2013.01); *H04L 5/0053* (2013.01)

(56) References Cited

U.S. PATENT DOCUMENTS

| | | | |
|---|---|---|---|
| 11,317,397 B2 * | 4/2022 | Yi | .............. H04W 72/0453 |
| 2011/0188441 A1 | 8/2011 | Kim et al. | |
| 2011/0230225 A1 | 9/2011 | Yokoyama | |
| 2017/0324524 A1 | 11/2017 | Zhou et al. | |
| 2018/0132243 A1 | 5/2018 | Yang et al. | |
| 2018/0220438 A1 | 8/2018 | Liu et al. | |
| 2019/0289668 A1 | 9/2019 | He et al. | |
| 2019/0349153 A1 | 11/2019 | Li et al. | |
| 2020/0059345 A1 | 2/2020 | Pelletier et al. | |
| 2020/0106562 A1 | 4/2020 | Choi et al. | |

FOREIGN PATENT DOCUMENTS

| | | |
|---|---|---|
| EP | 2765724 | 8/2014 |
| KR | 20140073534 | 6/2014 |
| RU | 2515553 | 5/2014 |
| WO | WO2010109513 | 9/2010 |
| WO | WO2016130175 | 8/2016 |
| WO | WO2016164739 | 10/2016 |
| WO | WO-2016164739 A1 * | 10/2016 .......... H04L 1/0026 |

OTHER PUBLICATIONS

AT&T, "NR and LTE Co-Existence," RP-166489, 3GPP TSG RAN WG1 Meeting #86, Göteborg, Sweden, Aug. 22-26, 2016, 3 pages.
Extended European Search Report in European Application No. 17866809.1, dated Sep. 11, 2019, 9 pages.
InterDigital Communications, "UE Support for Multiple Numerologies for NR," 3GPP TSG-RAN WG1 #86bis, R1-1610022, Oct. 10-14, 2016, 7 pages.
InterDigital Communications, "DL control channel framework for NR", R1-1610089, 3GPP TSG-RAN WG1 #86bis, Lisbon, Portugal, Oct. 10-14, 2016, 5 pages.
Japanese Notice of Allowance in Japanese Appln. No. 2019-522809, dated Feb. 2, 2021, 5 pages (with English translation).
LG Electronics, "Discussion on Wideband Operation", R1-1611781, 3GPP TSG RAN WG1 Meeting #87, Reno, USA Nov. 14-18, 2016, 5 pages.
MediaTek Inc., "Discussion on resource allocation of NB-PUSCH," R1-160164, 3GPP TSG-RAN WG1 NB-IOT Ad-Hoc Meeting, Budapest, Hungary, Jan. 18-20, 2016, 5 pages.
MediaTek, "Way Forward on bandwidth adaptation in NR," R1-1611041, 3GPP TSG-RAN WG1 #86bis, Lisbon, Portugal, Oct. 10-14, 2016, 4 pages.
Nokia, "Intra-carrier sub-band for mixed numerology," 3GPP TSG-RAN WG1 #86-Bis, R1-1609660, Oct. 10-14, 2016, 5 pages.
Samsung, "Discussion on sync. signal considering forward compatibility aspects," 3GPP TSG RAN WG1 #86, R1-166744, Aug. 22-26, 2016, 6 pages.
Singapore Office Action in Singapore Appln. No. 11201903298P, dated Oct. 21, 2020, 7 pages.
Zhang et al., "Filtered-OFDM—Enabler for Flexible Waveform in the 5th Generation Cellular Networks," IEEE Globecom, Dec. 2015, 6 pages.
ZTE Corporation, ZTE Microelectronics, "On forward compatibility for new radio interface", R1-166210, 3GPP TSG RAN WG1 Meeting #86, Gothenburg, Sweden, Aug. 22-26, 2016, 8 pages.
Office Action in Chinese Appln. No. 201780067031.0, dated Aug. 23, 2022, 14 pages (with English translation).

* cited by examiner

METHOD AND APPARATUS FOR CONFIGURING SUBBAND AGGREGATION IN NR CARRIER IN WIRELESS COMMUNICATION SYSTEM

CROSS-REFERENCE TO RELATED APPLICATIONS

This application is a continuation of U.S. application Ser. No. 16/936,962, filed on Jul. 23, 2020, which is a continuation of U.S. application Ser. No. 16/064,936, filed on Jun. 21, 2018, now U.S. Pat. No. 10,743,299, which is a National Stage filing under 35 U.S.C. 371 of International Application No. PCT/KR2017/012255, filed on Nov. 1, 2017, which claims the benefit of U.S. Provisional Applications No. 62/416,108 filed on Nov. 1, 2016, No. 62/417,449 filed on Nov. 4, 2016, No. 62/452,393 filed on Jan. 31, 2017, No. 62/457,802 filed on Feb. 10, 2017, and No. 62/492,935 filed on May 1, 2017, the contents of which are all hereby incorporated by reference herein in their entirety.

BACKGROUND OF THE INVENTION

Field of the Invention

The present invention relates to wireless communications, and more particularly, to a method and apparatus for configuring subband aggregation in a new radio access technology (NR) carrier in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) for convenience.

In NR, analog beamforming may be introduced. In case of millimeter wave (mmW), the wavelength is shortened so that a plurality of antennas can be installed in the same area. For example, in the 30 GHz band, a total of 100 antenna elements can be installed in a 2-dimension array of 0.5 lambda (wavelength) intervals on a panel of 5 by 5 cm with a wavelength of 1 cm. Therefore, in mmW, multiple antenna elements can be used to increase the beamforming gain to increase the coverage or increase the throughput.

In this case, if a transceiver unit (TXRU) is provided so that transmission power and phase can be adjusted for each antenna element, independent beamforming is possible for each frequency resource. However, installing a TXRU on all 100 antenna elements has a problem in terms of cost effectiveness. Therefore, a method of mapping a plurality of antenna elements to one TXRU and adjusting the direction of a beam using an analog phase shifter is considered. This analog beamforming method has a disadvantage that it cannot perform frequency selective beaming because it can make only one beam direction in all bands.

A hybrid beamforming with B TXRUs, which is an intermediate form of digital beamforming and analog beamforming, and fewer than Q antenna elements, can be considered. In this case, although there is a difference depending on the connection method of the B TXRU and Q antenna elements, the direction of the beam that can be simultaneously transmitted is limited to B or less.

For operating NR efficiently, various schemes have been discussed.

SUMMARY OF THE INVENTION

The present invention provides a method and apparatus for configuring subband aggregation in a new radio access technology (NR) carrier in a wireless communication system. The present invention proposes handling wideband carrier where different user equipments (UEs) may support different UE system bandwidth and also the configured bandwidth is changed for UE power saving and efficient resource management.

In an aspect, a method for configuring a data subband by a user equipment (UE) in a wireless communication system is provided. The method includes receiving an indication of a data subband from a network, configuring at least one data subband according to the indication, and performing communication with the network via the at least one data subband. One data subband consists of contiguous or non-contiguous physical resource blocks (PRBs).

In another aspect, a user equipment (UE) in a wireless communication system is provided. The UE includes a memory, a transceiver, and a processor, operably coupled to the memory and the transceiver, that controls the transceiver to receive an indication of a data subband from a network, configures at least one data subband according to the indication, and controls the transceiver to perform communication with the network via the at least one data subband. One data subband consists of contiguous or non-contiguous physical resource blocks (PRBs).

Efficient communication between UE and network and resource management can be enabled by using subbands in a NR carrier.

DESCRIPTION OF EXEMPLARY EMBODIMENTS

Figure 1:
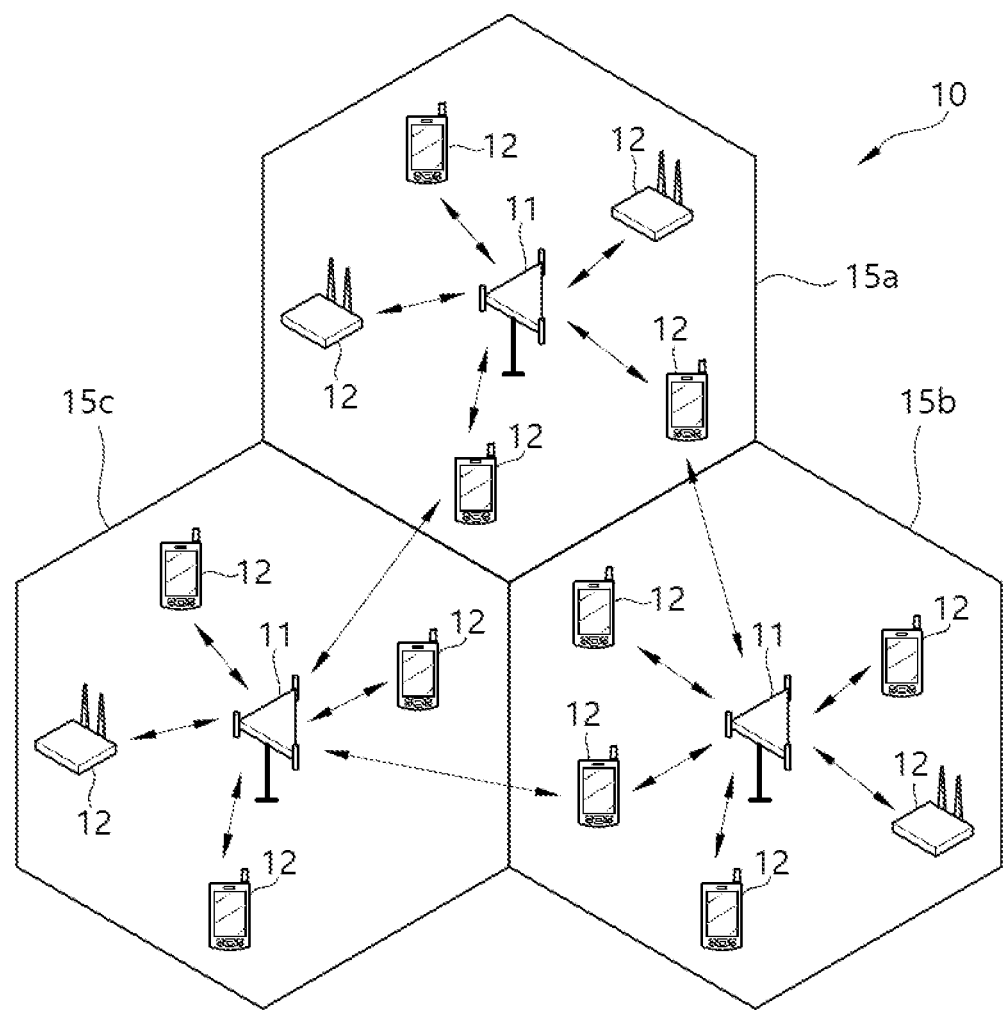
FIG. 1 shows a 3GPP LTE system.

FIG. 1 shows a 3GPP LTE system. The 3rd generation partnership project (3GPP) long-term evolution (LTE) system 10 includes at least one eNodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
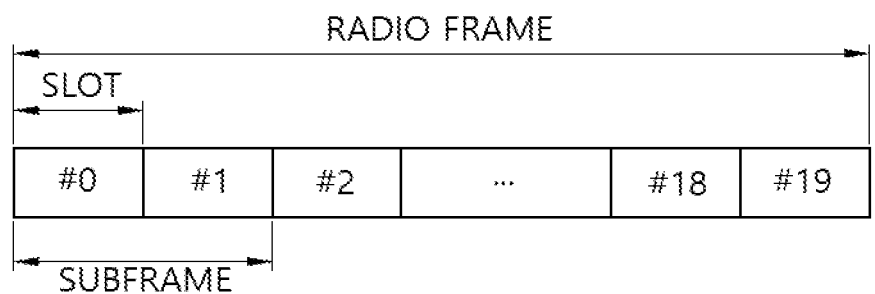
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes. In a TDD system, to allow fast switching between DL and UL, UL and DL transmission may be performed within a same subframe/slot in time division multiplexing (TDM)/frequency division multiplexing (FDM) manner.

Figure 3:
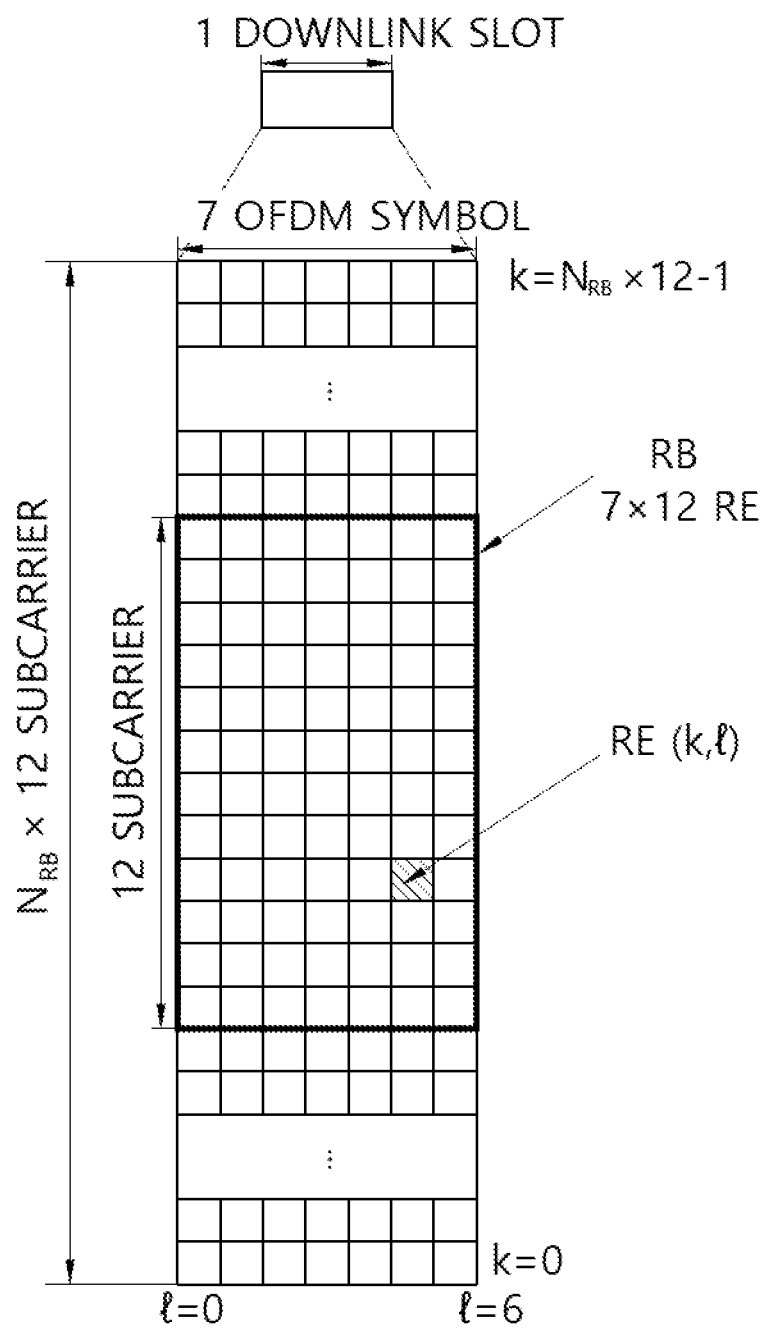
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 or 12×14 resource elements. The number $N_{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7 or 14, and in case of an extended CP, the number of OFDM symbols is 6 or 12. One of 128, 256, 512, 1024, 1536, 2048, 4096 and 8192 may be selectively used as the number of subcarriers in one OFDM symbol.

5th generation mobile networks or 5th generation wireless systems, abbreviated 5G, are the proposed next telecommunications standards beyond the current 4G LTE/international mobile telecommunications (IMT)-advanced standards. 5G includes both new radio access technology (new RAT or NR) and LTE evolution. Hereinafter, among 5G, NR will be focused. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things.

NR may use the OFDM transmission scheme or a similar transmission scheme. NR may follow the existing LTE/LTE-A numerology, or may follow the different numerology from the existing LTE/LTE-A numerology. NR may have a larger system bandwidth (e.g. 100 MHz). Or, one cell may support multiple numerologies in NR. That is, UEs operating in different numerologies may coexist within one cell in NR.

It is expected that different frame structure may be necessary for NR. Particularly, different frame structure in which UL and DL may be present in every subframe or may change very frequently in the same carrier may be necessary for NR. Different application may require different minimum size of DL or UL portions to support different latency and coverage requirements. For example, massive machine-type communication (mMTC) for high coverage case may require relatively long DL and UL portion so that one transmission can be successfully transmitted. Furthermore, due to different requirement on synchronization and tracking accuracy requirements, different subcarrier spacing and/or different CP length may be considered. In this sense, it is necessary to consider mechanisms to allow different frame structures coexisting in the same carrier and be operated by the same cell/eNB.

In NR, utilizing a subframe in which downlink and uplink are contained may be considered. This scheme may be applied for paired spectrum and unpaired spectrum. The paired spectrum means that one carrier consists of two carriers. For example, in the paired spectrum, the one carrier may include a DL carrier and an UL carrier, which are paired with each other. In the paired spectrum, communication, such as DL, UL, device-to-device communication, and/or relay communication, may be performed by utilizing the paired spectrum. The unpaired spectrum means that that one carrier consists of only one carrier, like the current 4G LTE. In the unpaired spectrum, communication, such as DL, UL, device-to-device communication, and/or relay communication, may be performed in the unpaired spectrum.

Further, in NR, the following subframe types may be considered to support the paired spectrum and the unpaired spectrum mentioned above.

(1) Subframes including DL control and DL data
(2) Subframes including DL control, DL data, and UL control
(3) Subframes including DL control and UL data
(4) Subframes including DL control, UL data, and UL control
(5) Subframes including access signals or random access signals or other purposes.
(6) Subframes including both DL/UL and all UL signals.

However, the subframe types listed above are only exemplary, and other subframe types may also be considered.

Figure 4:
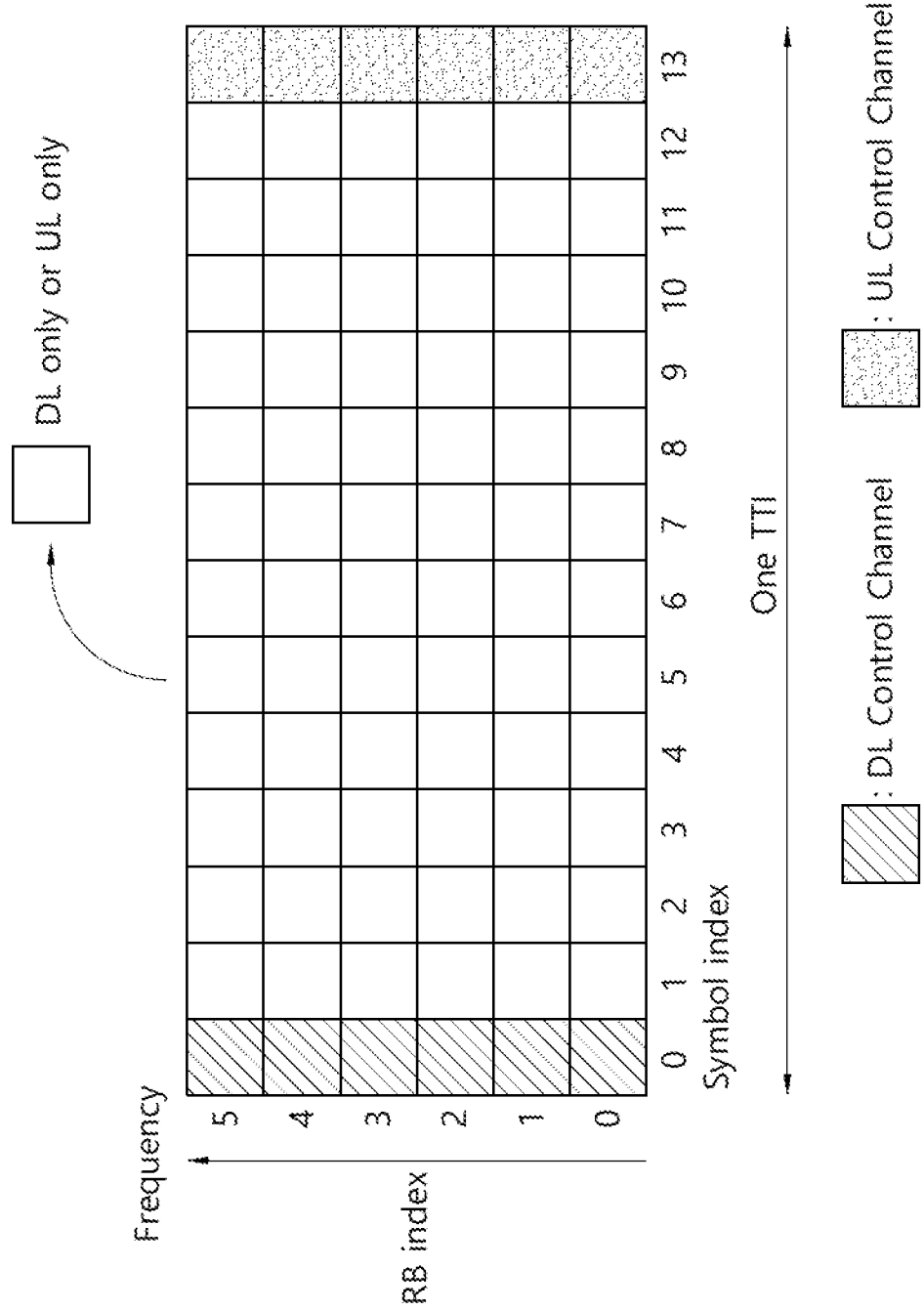
FIG. 4 shows an example of subframe type for NR.

FIG. 4 shows an example of subframe type for NR. The subframe shown in FIG. 4 may be used in TDD system of NR, in order to minimize latency of data transmission. Referring to FIG. 4, the subframe contains 14 symbols in one TTI, like the current subframe. However, the subframe includes DL control channel in the first symbol, and UL control channel in the last symbol. A region for DL control channel indicates a transmission area of a physical downlink control channel (PDCCH) for Downlink control information (DCI) transmission, and a region for UL control channel indicates a transmission area of a physical uplink control channel (PUCCH) for uplink control information (UCI) transmission. Here, the control information transmitted by the eNB to the UE through the DCI may include information on the cell configuration that the UE should know, DL specific information such as DL scheduling, and UL specific information such as UL grant. Also, the control information transmitted by the UE to the eNB through the UCI may include a hybrid automatic repeat request (HARQ) acknowledgement/non-acknowledgement (ACK/NACK) report for the DL data, a channel state information (CSI) report on the DL channel status, and a scheduling request (SR). The remaining symbols may be used for DL data transmission (e.g. physical downlink shared channel (PDSCH)) or for UL data transmission (e.g. physical uplink shared channel (PUSCH)).

According to this subframe structure, DL transmission and UL transmission may sequentially proceed in one subframe. Accordingly, DL data may be transmitted in the subframe, and UL acknowledgement/non-acknowledgement (ACK/NACK) may also be received in the subframe. In this manner, the subframe shown in FIG. 4 may be referred to as self-contained subframe. As a result, it may take less time to retransmit data when a data transmission error occurs, thereby minimizing the latency of final data transmission. In the self-contained subframe structure, a time gap may be required for the transition process from the transmission mode to the reception mode or from the reception mode to the transmission mode. For this purpose, some OFDM symbols at the time of switching from DL to UL in the subframe structure may be set to the guard period (GP).

In NR, wideband may be used if the network supports. Further in NR, both network and UE may have different bandwidths to be supported. In this case, it may need to be clarified how the network and UE operate transmission and reception.

Figure 5:
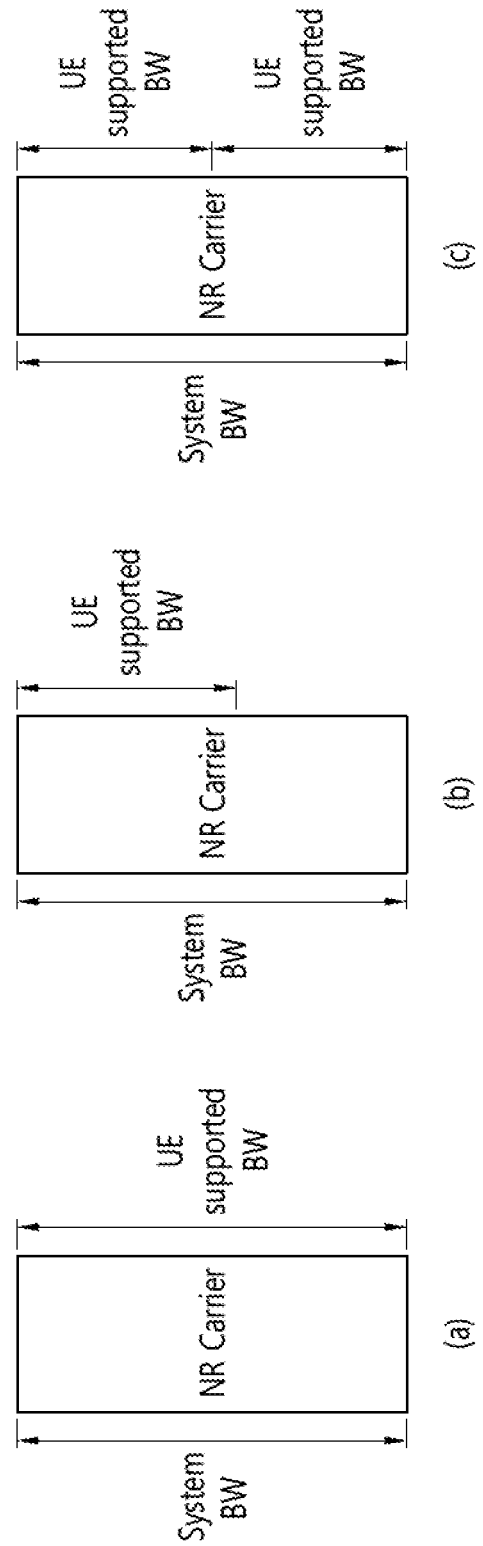
FIG. 5 shows an example of different system bandwidth between network and UE in a NR carrier.

FIG. 5 shows an example of different system bandwidth between network and UE in a NR carrier. The carrier bandwidth that the network supports may be a system bandwidth. The UE supported bandwidth may be equal to the system bandwidth or different from the system bandwidth (may be narrower or wider than the system bandwidth). FIG. 5-(a) shows a case that the system bandwidth is same as the UE supported bandwidth. FIG. 5-(b) shows a case that the system bandwidth is different from the UE supported bandwidth, i.e. the system bandwidth is wider than the UE supported bandwidth. FIG. 5-(c) shows a case that the system bandwidth is different from the UE supported bandwidth, i.e. the system bandwidth is wider than the UE supported bandwidth. But contrary to FIG. 5-(b), the UE may support wide bandwidth with multiple radio frequency (RF) components. A baseband component may be shared among multiple RFs components, or separate baseband component may be dedicated per RF component. Though it may depend on UE capability, in the present invention, it is assumed that baseband component/capability may be shared among multiple RF components.

Figure 6:
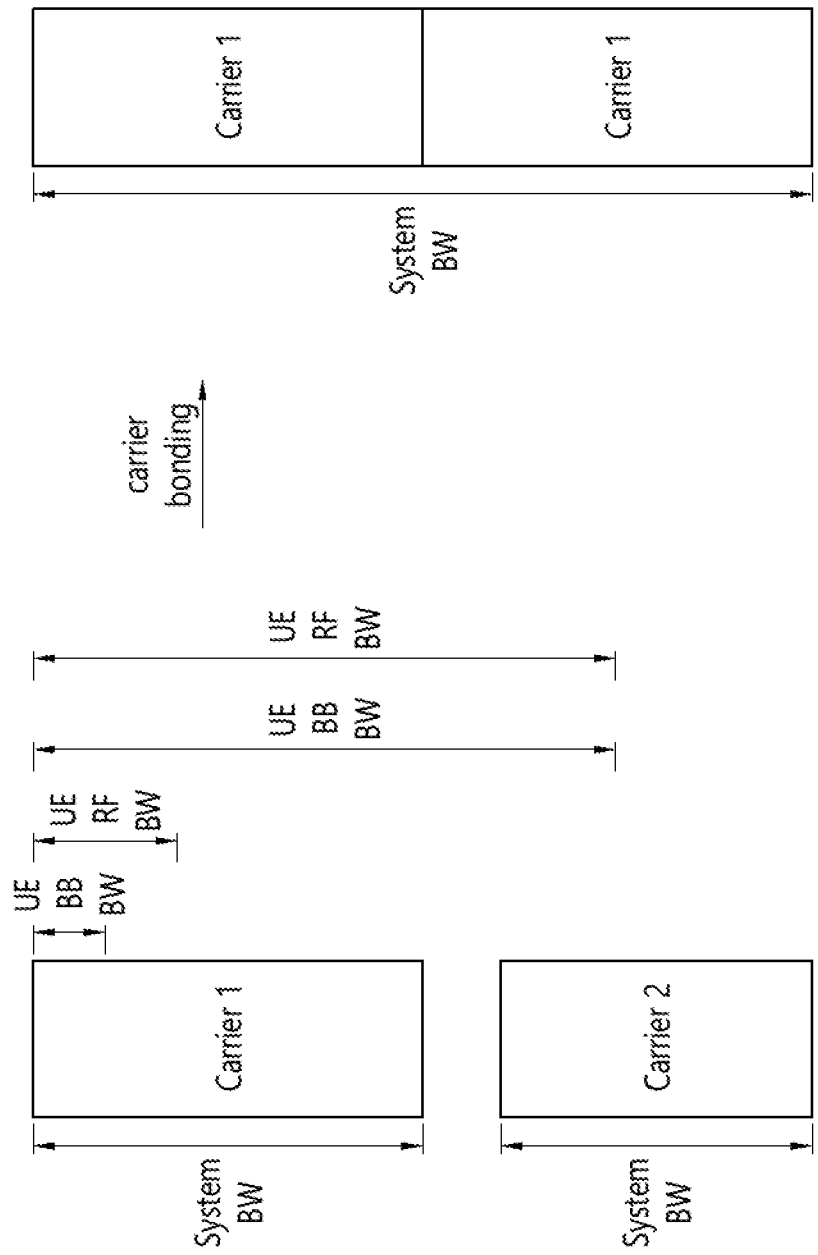
FIG. 6 shows an example of carrier bonding.

FIG. 6 shows an example of carrier bonding. Depending on necessary system bandwidth, the network may bond multiple NR carriers. If multiple NR carriers are bonded and formed as one NR carrier, the system bandwidth may be changed. The center frequency may also be changed. Though, the direct current (DC) center may or may not be changed depending on network operation. If the DC center is changed, it may be indicated to UEs so that DC carrier can be correctly handled.

In these scenarios, how to assign UE-system bandwidth to UEs may follow by at least one of options below.

(1) A NR carrier may be divided into a set of minimum-subband (M-SB). A subset of M-SBs may be configured to UE via UE-specific signaling.

(2) A UE may be configured with start and end frequency location of the UE-specific system bandwidth via UE-specific signaling.

(3) A NR carrier may be divided into a set of physical resource blocks (PRBs), and a set of PRBs may be configured to UE via UE-specific signaling.

(4) A NR carrier may be divided into a set of PRB groups, and a set of PRB groups may be configured to UE via UE-specific signaling. The PRB group may consist of M PRBs which may be contiguous. M PRBs may be chosen such that the size is the same as one PRB based on the largest subcarrier spacing that the NR carrier supports.

When a set of PRBs are used for UE-specific bandwidth, it may be based on reference numerology (or, default numerology or base numerology) used in synchronization. Or, it may be fixed in the specification. Or, it may be indicated implicitly or explicitly via system information block (SIB) and/or master information block (MIB).

If carrier bonding is applied, the system bandwidth may be updated via SIB and/or MIB. As mentioned above, center frequency and/or DC carrier may also be updated via SIB and/or MIB.

For the convenience, in the present invention, it is assumed that a NR carrier consists of M PRBs, based on the reference numerology.

Hereinafter, various aspects of the UE system bandwidth in NR carrier according to embodiments of the present invention is described.

1. Subband Definitions

First, a minimum-subband (M-SB) according to an embodiment of the present invention is described. Assuming that the minimum bandwidth that a UE supports (at least enhanced mobile broadband (eMBB) UE or UE with relatively high data rate) is K PRBs, and that a UE may support multiple of K PRBs, the M-SB may be formed as K PRBs or multiple of K PRBs. A UE may support bandwidth between K*M PRBs to K*(M+1) PRBs, and a UE may be configured with K*M PRBs or (K+1)*M PRBs. In this case, some PRBs are not used for UE scheduling. Different size of K may be supported by a single NR carrier. For example, if there are three different UE bandwidths supported e.g. K1, K2, and K3, the system bandwidth may be divided in to N1*K1 PRBs, N2*K2 PRBs, and N3*K3 PRBs. In other words, different sizes of subbands may be formed within the system bandwidth.

If the M-SB is defined in the system bandwidth, the transmission of such as synchronization signals, physical broadcast channel (PBCH), etc., may be performed within one of M-SB. The one M-SB may be called anchor M-SB. To keep synchronization signals, PBCH, etc., within the anchor M-SB, RB indexing may be started from the location of synchronization signals, PBCH, etc.

Figure 7:
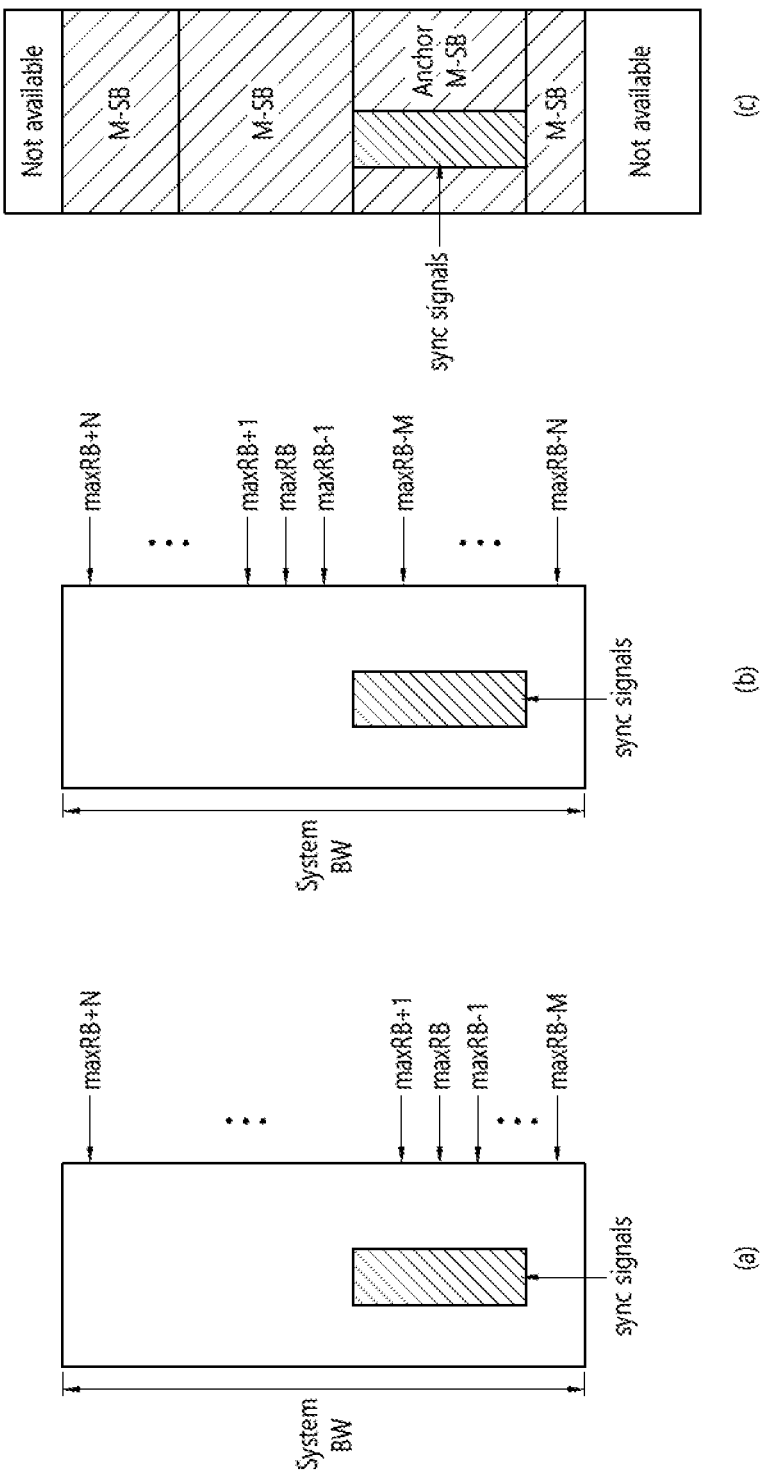
FIG. 7 shows an example of RB indexing according to an embodiment of the present invention.

FIG. 7 shows an example of RB indexing according to an embodiment of the present invention. Referring to FIG. 7, RB indexing always starts from the center of anchor M-SB or center of synchronization signal (SS) block transmitted within anchor M-SB. If multiple SS blocks are present in the NR carrier, the starting index in which a common PRB indexing can start may be indicated, or the offset between the center of M-SB or SS block and the reference point for the common PRB indexing may be indicated. As synchronization signal may present in edge of system bandwidth, the indexing should be sufficiently large (e.g. more than 2*maxRB). Referring to FIG. 7-(b), Different from LTE, the resource indexing in NR may not be affected by the system bandwidth (whether odd or even) to simplify the indexing. Furthermore, maxRB is the potential maximum RB size including guard band to cover the largest system bandwidth that the NR supports. If maxRB is too large, overall size of RB index may increase. Therefore, in order to minimize the indexing overhead, PBCH and/or SIB may indicate RB offset which may be extracted from each RB index to reduce RB index value. For example, if maxRB is 10000, and system bandwidth is only 100 RBs, RB offset of 9800 may be configured so that RB index can be fallen into the range of [0, 200]. Alternatively, maxRB may be determined from the system bandwidth indicated by PBCH/SIB, and maxRB may be defined as 2*system bandwidth in RB.

Instead, if system bandwidth is not given, maxRB may be indicated where the UE may assume that system bandwidth of the NR carrier is smaller than maxRB, and larger than the anchor M-SB. For example, when carrier bonding or carrier segment aggregation are dynamically utilized, the system bandwidth of the network which can change dynamically may not be indicated. Rather, any necessary information to form the RB grid may be given. The numerology used in synchronization signal and/or PBCH, which is called reference numerology (or, default numerology or base numerology), may be different from the numerology mostly used in data scheduling or common signal scheduling. In terms of PRB indexing for PBCH, maxRB may be the same as bandwidth of PBCH. In other words, RB indexing for PBCH may be locally determined within PBCH bandwidth. For other channels, center frequency and maxRB (either based on system bandwidth or defined value) may be used for RB grid formation.

The edge M-SB with smaller size than full M-SB may also be utilized for data scheduling. If the system bandwidth is not known to UE, the use of only available PRBs may be handled by the network.

The definition of M-SB may be used only for common data, such as SIB, random access response (RAR), paging, etc.

If SIB is transmitted via PDCCH, the resource set for PDCCH carrying SIB may also be restricted to the minimum bandwidth. The minimum bandwidth may be defined as min (system bandwidth, UE minimum bandwidth). The UE minimum bandwidth may be defined in the specification, and may be different per frequency range or band. The location and bandwidth of PDCCH resource set within the system bandwidth may be indicated by PBCH. Also, necessary information for PDCCH resource set for SIB may be indicated by PBCH or additional PBCH. In terms of configuring common search space (CSS) for PDCCH, the following options may be considered.

(1) Option 1: System bandwidth may be divided into a set of subbands, and each subband size is K PRBs. A set of PDCCH resource sets may be defined/configured per each subband, and a UE may be configured to monitor one of them. The same configuration may be applied for each subband. If this option is used, regardless of UE monitoring subband, a UE can search the same CSS. If this is used, configuration of CSS for PDCCH may include at least one of the followings.

Number of PRBs within a subband: The PRB may be started from the lowest frequency or highest frequency. Or, additional offset may also be configured, or PRBs within a subband may also be explicitly indicated.

Number of OFDM symbols used for CSS

Blind decoding candidates per aggregation level (AL)

Transmission scheme and associated parameters for transmission scheme

The CSS for PDCCH may be configured/applied within a subband where a UE is configured to monitor. If a UE is configured with multiple subbands, the configuration may apply to the first subband or indicated subband for control monitoring. The benefit of this approach is that a UE is not required to change its SS configuration, even though the UE changes its monitoring subband. Also, within each subband, necessary synchronization signals and measurement reference signal (RS) may be transmitted.

(2) Option 2: Different search space may be configured per UE depending on UE supported bandwidth. In this case, separate configuration may be considered depending on UE supported bandwidth.

Figure 8:
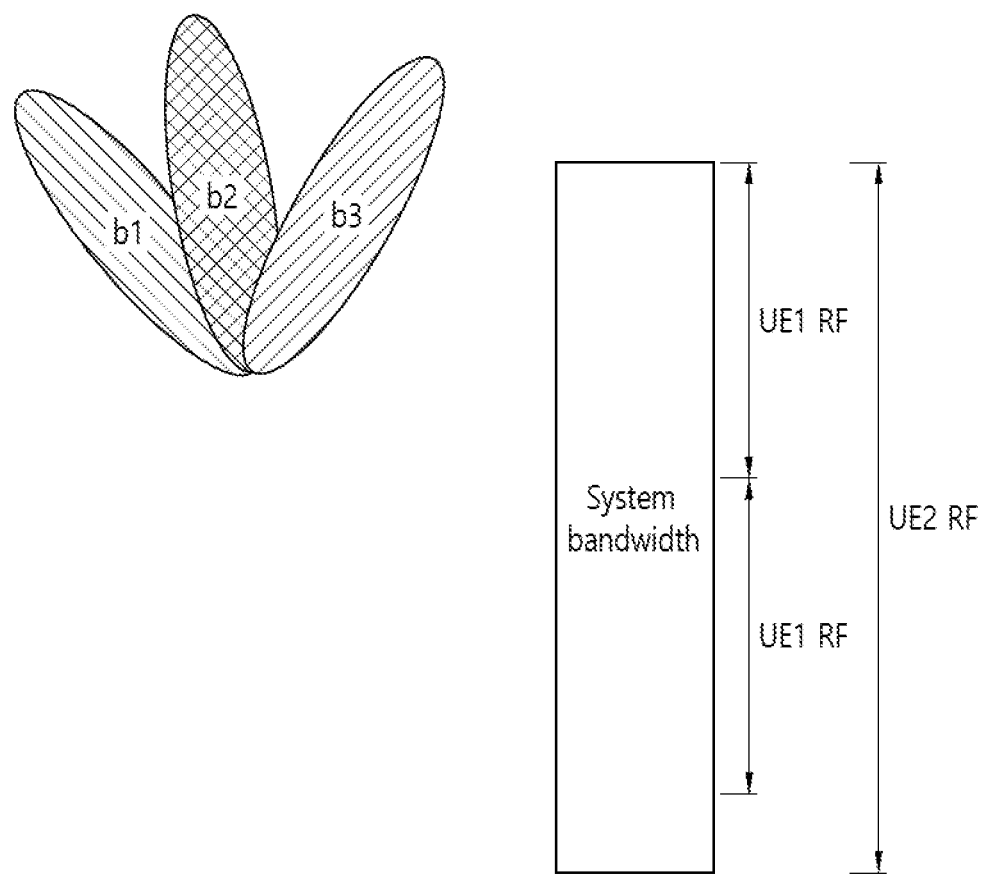
FIG. 8 shows an example of configuration of different search space per UE according to an embodiment of the present invention.

FIG. 8 shows an example of configuration of different search space per UE according to an embodiment of the present invention. Referring to FIG. 8, UE1 monitors beam b1 and b2, and UE2 monitors beam b2 and b3. Further, bandwidth supported by UE1 is narrower than the system bandwidth, and bandwidth supported by UE2 is equal to the system bandwidth.

As synchronization signals may not be placed in the network carrier, depending on the synchronization signals, the relationship between subband and anchor subband may be different. In terms of placing anchor subband, the following options may be considered.

(1) Option 1: Anchor subband may be placed only at one of the determined subband. The subband size may be determined based on the system bandwidth, and then, anchor subband should belong to one of subband. For example, when system bandwidth is 400 MHz, and the subband size is 100 MHz, anchor subband should be one of four subbands. Within the anchor subband, the location of initial synchronization signals may be flexible and may be placed anywhere within the anchor subband. This may restrict the possible location for initial synchronization signals. However, if there are different bandwidth supported by the network in the same frequency band, it may also be desirable to have some alignment between different system bandwidth. For example, if one cell wants to operate in 4*100 MHz and another cell wants to operate in 400 MHz, subband size of 100 MHz may be beneficial to align different system bandwidth among cells in the same frequency. However, again, this may restrict the possible location of synchronization signals.

Subband formation may be defined per frequency range or per frequency band. For example, current LTE band may be reframed or shared with NR, and in this case, subband can be 1 and the subband size may be same as system bandwidth. In other words, subband may not be supported in frequency band equivalent to or overlapped with LTE frequency. Alternatively, if NR band is redefined which may span more than one LTE frequency band, it is also possible that some UEs may not support the system bandwidth. In other words, the above condition may occur in such cases as well. For that, fixed subband size, e.g. 20 MHz or 10 MHz depending on UE minimum bandwidth requirement or typical UE RF bandwidth, may be decided even in frequency band overlapped with LTE frequency bands.

If this option is used, the location of synchronization or SS block may be limited by subband size. In other words, some synchronization raster may not be used for synchronization signal mapping which may lead SS block across subbands (i.e. not fully contained within a subband). In other words, a UE may assume that some synchronization raster are not necessary to be searched as there may be no synchronization signal mapping in such candidates, as it cannot be contained within one subband.

(2) Option 2: Anchor subband may be formed based on initial synchronization. Based on synchronization signals assuming that the center of SS block is the center of anchor subband, anchor subband may be formed implicitly. The size of anchor subband may be defined in the specification or configured by MIB. If this option is used, if the frequency in which synchronization is transmitted are different among neighbor cells, subband may not be aligned among neighbor cells. Furthermore, subcarrier and RB grid may not be aligned, either.

(3) Option 3: Anchor subband and other subband for UE-specific bandwidth may be handled separately. In other words, subband formation may be based on system bandwidth or specified in the specification per frequency range or band as mentioned in Option 1, while synchronization signals may be transmitted without being tied with subband formation. In other words, synchronization signals may be transmitted in anywhere, and thus, anchor subband may be formed overlapped partially or fully with subband.

Figure 9:
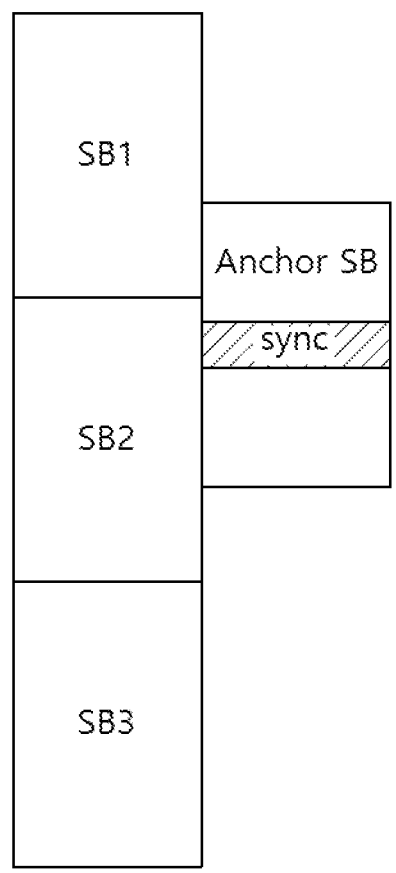
FIG. 9 shows an example of handling anchor subband and other subband for UE-specific bandwidth separately according to an embodiment of the present invention.

FIG. 9 shows an example of handling anchor subband and other subband for UE-specific bandwidth separately according to an embodiment of the present invention. Referring to FIG. 9, subband formation and anchor subband are configured separately. Therefore, anchor subband which carries synchronization signal is overlapped with subband.

(4) Option 4: Subbands may be formed based on center frequency indicated by the PBCH, and maximum system bandwidth may be defined per frequency range or per frequency band or may be indicated by MIB. In other words, subband size and maximum system bandwidth may be indicated by the network, and actual system bandwidth may or may not be indicated. Such values may be predefined in the specification which may vary depending on frequency. When this option is used, a UE may not be able to access some subbands. In such case, the frequency region which the UE can access should be known to the UE via subband allocation or UE-specific bandwidth allocation or by common signaling. If the network adapts its bandwidth dynamically for power saving depending on UEs, anchor subband may be included in the minimum system bandwidth. The bandwidth may be indicated as minimum system bandwidth. To allow dynamic bandwidth adaptation, it may also be possible to change dynamic reserved resource which may be indicated by semi-static and/or dynamic signaling, such as group common PDCCH.

When subband formation is configured/defined, a set of subbands may be explicitly indicated to a UE via group common signaling. Alternatively, a set of subbands may be implicitly indicated to a UE with start and end of frequency region with which a UE is configured. The frequency region may contain one or more subbands. In case of multiple subbands, a UE may also be indicated with additional information of subband within the configured frequency region.

Initial access subband according to an embodiment of the present invention may also be defined. When SS block size may be smaller than the subband size, CSS for SIB reading should be clarified. One approach is to configure CSS for SIB within the SS block so that a UE is not required to perform any frequency retuning. Another approach is to configure CSS for SIB by the MIB which may or may not require frequency retuning. If subband is not formed based on SS block, at least for CSS for SIB, it may be formed within the SS block or around SS block. In other words, CSS for SIB may be indicated by PBCH.

At SIB, further information on CSS for other subband may be informed. Alternatively, anchor subband may always be formed part of subband. To be aligned with subband, the offset between subband center and SS block center may be informed or based on system bandwidth, and accordingly, subband formation may be known to the UE. Alternatively, when CSS is configured, the PRB indexing of CSS may be configured based on the center of SS block. In other words, offset relative to SS block may be used for frequency location for CSS for SIB. Assuming maximum subband size or defined subband size, virtual RB indexing may be formed around SS block, and a set of PRBs may be configured for CSS. This implies that PRB indexing is performed around SS block instead of center of the system bandwidth. When this approach is used, similar manner may be used for UL PRB indexing. Or, UL PRB indexing may be performed based on the center of uplink or based on a reference UL frequency. UL frequency may be indicated for each UL carrier. As different UL center may be configured for different UEs, this assumes that center of UL carrier is indicated/informed via MIB/SIB.

When anchor subband is not part of subband or is overlapped with multiple subbands, for PBCH, PRB indexing may follow PRB indexing within SS block or minimum system bandwidth. Other PRB indexing for other channels may follow subband formation once subband formation is known to the UE. In other words, a UE may assume SS block as a center for PRB indexing until it acquires information about system bandwidth's center. Or, UE may assume SS block center as PRB indexing's center regardless of actual center. After that, PRB indexing may be based on subband bandwidth or system bandwidth depending on the assumption or information carried on MIB. For example, if MIB carries system bandwidth, PRB indexing may be based on system bandwidth. And if MIB does not carry system bandwidth, PRB indexing may be based on subband bandwidth.

For initial access, anchor M-SB may be used. This is at least supported for unpaired spectrum. Alternatively, other region may be indicated e.g. via physical random access channel (PRACH) configuration. Based on PRACH configuration, a UE may switch UL frequency, and PRACH configuration may also include control subband (within an M-SB possibly) information where RAR can be expected. M-SB of Msg3 may be dynamically or semi-statically configured by RAR or SIB (e.g. remaining system information (RMSI)). As a default, the same M-SB for PRACH may be used for Msg3 transmission. For M-SB of Msg4, the same M-SB or same control subband for RAR may be used, or M-SB of Msg4 may be dynamically or semi-statically indicated by RAR or SIB. For data subband, unless otherwise configured, M-SB in which control subband is located may be used for DL data subband, and M-SB in which UL transmission is scheduled may be used for UL data subband for non-UE-specific data transmission. The similar concept may be applied for single cell point-to-multipoint (SC-PTM) or any other multicast transmission, sidelink, and broadcast mechanism.

UE-specific bandwidth for DL/UL according to an embodiment of the present invention is described. Control subband used for Msg4 may be used for UE-specific search space (USS), until it is reconfigured. In Msg3, necessary channel state information (CSI) feedback may be delivered for supporting localized mapping. If any feedback is not sufficient, first distributed mapping may be used for search space for Msg4 and default USS. Default data subband for USS may be defined in M-SB in which Msg4 control subband is configured until it is reconfigured. This default data subband may be smaller than the UE capable bandwidth. The UE may report its capability in terms of bandwidth support via Msg3. Or, PRACH configuration may be configured so that different bandwidth supporting UEs can select different PRACH resource and thus by detecting PRACH, the network can know the bandwidth capability. When a UE is reconfigured with control region for USS, control subband for Msg4 may be used as a fallback purpose. In the configuration, search space split between new USS and default USS may be indicated, or a UE may need to search both until radio resource control (RRC) reconfiguration is completed where search space is split equally between two search space. Or, default search space may be kept for possible fallback operation, PRACH operation, etc.

As long as it can be satisfied by UE capability in terms of RF/baseband, a UE may be configured with multiple data subband for DL and UL, respectively. More specifically, a transport block (TB) may be mapped for each data subband, and one data subband may be overlapped with another subband partially or fully.

Figure 10:
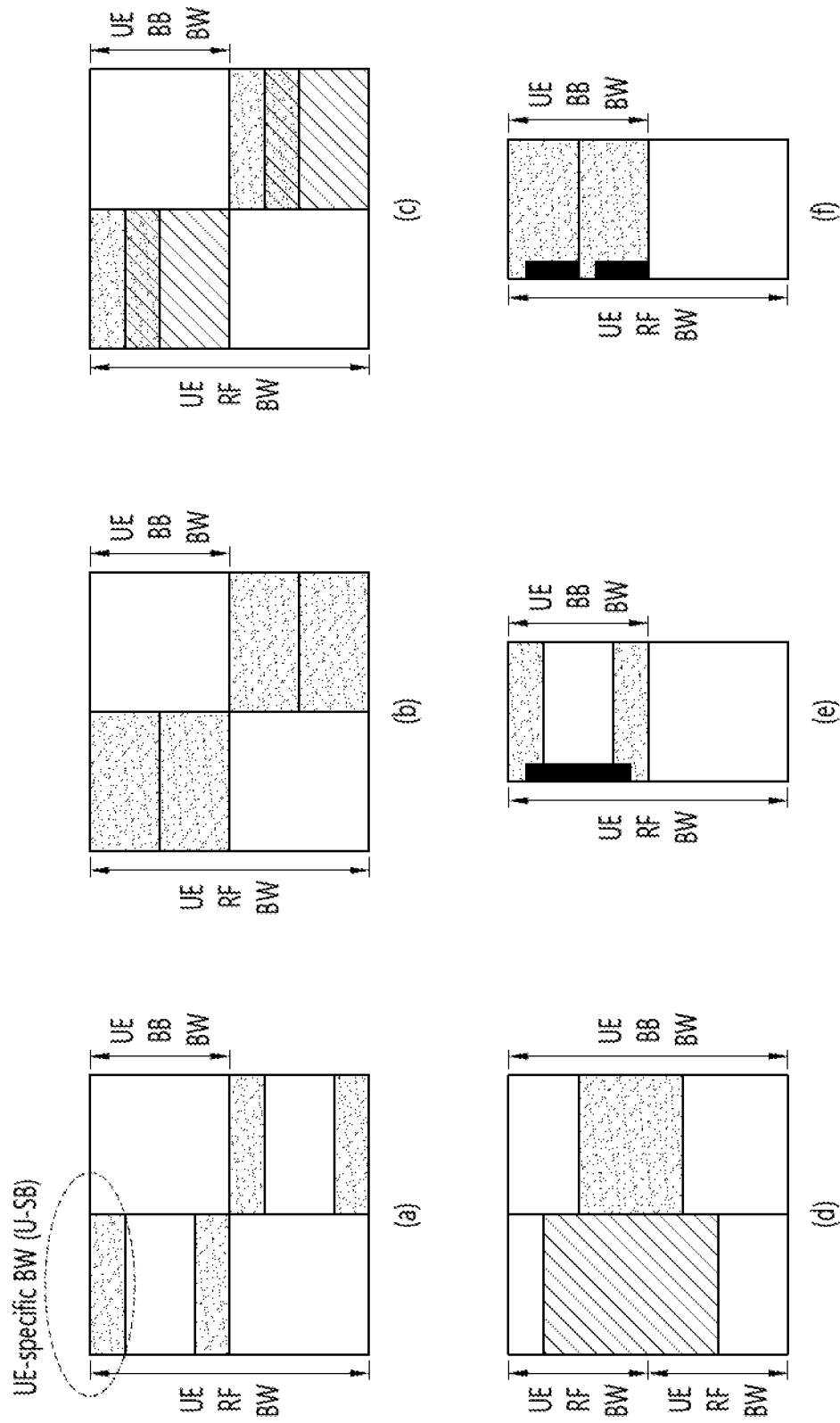
FIG. 10 shows examples of different UE-specific bandwidth options according to an embodiment of the present invention.

FIG. 10 shows examples of different UE-specific bandwidth options according to an embodiment of the present invention. Referring to FIG. 10, when multiple subbands are configured, it aggregation of subbands may be supported in different manners. Within a system bandwidth, depending on UE's data rate requirement, smaller bandwidth, which may be contiguous and non-contiguous, may be configured, and the frequency region(s) may be hopped to different region with or without frequency retuning delay depending on RF bandwidth capability. One of the reason to allow non-contiguous subband allocation is to enable frequency-selective scheduling. FIG. 10-(a) shows a case of intra-non-contiguous subband aggregation. FIG. 10-(b) shows a case of intra-contiguous subband aggregation. FIG. 10-(c) shows a case of overlap subband aggregation. FIG. 10-(d) shows a case of subband over multiple RFs. FIG. 10-(e) shows a case of control subband within UE bandwidth. FIG. 10-(e) shows a case of control subband within subband.

For convenience, the following subbands may be defined according to an embodiment of the present invention.

(1) Common data subband: There may be multiple common data subbands depending on common data type or purposes or radio network temporary identity (RNTI) or groups. For a given UE, there may be at most one common data subband for a given common data. Alternatively, the same procedure in UE data subband, which will be described below, may also be applicable to common data subband. Once a UE is configured with UE-specific data subband, at least one or more of configured UE-specific data subbands may also be used for common data subbands.

Common data subband may be defined separately for DL and UL. If the frequency region is different and outside of UE RF capability (and thus require frequency retuning), the gap between DL/UL may also include frequency retuning latency in unpaired spectrum. Frequency retuning may also be required if a UE has to switch center frequency. In that sense, if subbands are configured in different frequency regions which requires switching of center frequency, or need to adapt its center to optimize RF filter, it may also require retuning latency.

(2) Common control subband: Common control subband corresponds to a region in which control for common data is transmitted. Generally, this may be a subset of common data subband. Or, common data subband and common control subband may be placed within an M-SB or anchor M-SB.

(3) UE data subband (or, just data subband): One subband may consist of contiguous or non-contiguous PRBs from a UE perspective. At least one of the followings may be defined per data subband.

Numerology used for data transmission: Single numerology is defined per data subband.

Slot length, mini-slot length(s): TTI is defined per data subband.

RAT (e.g. NR, LTE) may be configured per UE data subband.

Maximum transport block size (TBS): Maximum TBS may be implicitly determined by the maximum number of RBs within a data subband, or may be explicitly indicated.

Maximum one TB mapped to one data subband. The maximum one TB may be per each layer if there are multiple layers. In this case, maximum number of TBs with multiple layers may be still supported within one data subband. Initial transmission and retransmission may occur in the same data subband or at least in the same data subband set. Data subband set may be defined as a set of data subband with the same numerology, and possibly different frequency domain resources and other configurations, such as control resource set configuration. A UE may be scheduled with a TB in at most one of data subband in one data subband set in a time. However, a UE may be scheduled with multiple TBs, and each TB may be mapped to one data subband in one data subband set, where multiple data subband sets are configured and multiple data subbands are activated.

Data subband should be within a UE-specific bandwidth, and UE-specific bandwidth may change with time. In other words, a UE may be configured with multiple data subbands, and one data subband may be activated at a time. As mentioned above, at most one data subband is activated at a given time from one data subband set. Data subband may be referred as a bandwidth part (BWP).

(4) UE control subband (or, just control subband): One or more control subband may be configured. Each data subband may have one or more control subbands, and the actual configuration may be separated and only the association may be indicated in data subband configuration. Control subband may be defined as follows.

Numerology used for control transmission: Single numerology is defined per control subband.

Monitoring interval: One configuration of monitoring interval is defined per control subband.

Resource element group (REG)/control channel element (CCE) index within a control subband: No cross REG/CCE indexing across different control subbands REG/CCE resource mapping manner: Localized or distributed may be configured.

2. Control Subband and Data Subband Mapping

The mapping between control subband to data subband may be 1-1 or n-1 or n-m or 1-m. Details are as follows.

(1) One control subband may schedule data to only one data subband. Accordingly, there is no need to indicate data subband in the resource allocation.

(2) Multiple control subbands may schedule data to one data subband: as it is still exclusive, there is no need to indicate data subband in resource allocation.

(3) One control subband may schedule data to multiple data subbands, and one data subband may be scheduled by multiple control subbands. In this case, indication of data subband is necessary. Data subband may be indicated in resource allocation or indicated separately. Alternatively, if one control subband schedules multiple data subbands, control subband or search space may be separated among data subbands. One approach is to divide candidates among multiple subbands. Another approach is to divide CCEs among multiple subbands. Particularly, this may be useful if anchor or primary subband is configured to a UE, and additional secondary subband(s) may be activated/deactivated dynamically. More details will be described below (5. Dynamic bandwidth sharing with SB-aggregation).

Further, when one control subband schedules data to multiple data subbands, subband index also needs to be identified in control information. First, one control subband may schedule one data subband from the same data subband set at a given time. As mentioned above, change of bandwidth without changing numerology may be realized by adding time-domain aspects on data subband or configuring multiple data subbands. In this case, multiple data subbands are formed as one data subband set. In this case, data subband change may be explicitly indicated or implicitly indicated depending on the data subband switching among data subbands belonging to the same data subband set. Second, one control subband may schedule one or multiple data subbands from multiple data subband sets at a given time. In this case, regardless of change of data subband within a data subband set, indicating data subband set is necessary. Both may be combined, and indication in DCI or resource allocation may indicate a data subband index. Data subband index may be uniquely configured for each data band regardless of data subband set. This may be particularly beneficial if a UE can be activated with multiple data subbands (or BWPs) and also support bandwidth adaptation across slots via scheduling DCI.

Further, it may be considerable to allow any configuration by the network. In this case, for each control subband, a set of data subbands which control subband may schedule may be indicated. If there is only one data subband, in resource allocation or additional field on data subband index may be omitted. If there are more than one data subbands, some indication on subband may be necessary. However, this may lead variable DCI size depending on the configured data subband. To address this, alternative approach is to assume that any control subband can schedule any data subband, and thus, the number of configured data subband to the UE is assumed for all resource allocation. For the control subband which schedules only one data subband, this field may be reserved. Alternatively, the size of data subband index fields may be configured for each control region. The bit size to indicate data subband index may be variable depending on the configured data subband to the UE (or for common data if configured). Bit size may also be zero if only one data subband is configured.

When multiple data subbands and control subbands are configured, UE-specific bandwidth may be defined as superset of data/control subbands in contiguous PRBs, or UE-specific bandwidth may be configured separately. If superset is used, the lowest PRB and the highest PRB in the configuration may define the UE-specific system bandwidth.

3. UE Capability

Depending on UE RF capability, a UE may be configured with more than one contiguous or non-contiguous UE-specific bandwidth (or UE-specific carrier). For example, a UE may support the following cases.

A UE may support contiguous intra-band carrier aggregation (CA) and/or non-contiguous intra-band CA with X1 . . . Xk (in case K carriers) system bandwidth. That is, a UE may support intra-band CA with less than k RF components. this case may be more necessary if the system bandwidth in NR is defined smaller than a UE typical RF capability A UE may support maximum RF bandwidth Xm≥max{X1 . . . Xk} in the band (at least in one RF component). That is, a UE may support intra-band CA with single RF. In this case, RF capability may include sum of supported bandwidth.

A UE may support k different RF components.

A UE may not be configured with intra-band CA with the capability of one RF component. For example, even if a UE supports 30 MHz, the network may not configure 10+20 MHz carriers unless the UE can support also 10+20 MHz carrier aggregation. In this case, the network may allocate 30 MHz carrier, and then may allocate 10+20 MHz data subbands aggregation. This implies that a carrier may have smaller system bandwidth than the UE typical/minimum RF capability, but the network cannot allocate a carrier smaller than the UE typical/minimum RF capability bandwidth carrier for intra-band contiguous CA. More generally, in only a few sets of UE RF capabilities, system bandwidth can be larger than combinations of UE RF capabilities (e.g. twice of maximum UE RF capability, sum of capability value 1+capability value 2).

This implies that a UE has separate RF to support intra-band contiguous or non-contiguous CA. In this case, a UE needs to be configured with a carrier per RF, and then may be configured control/data subbands within the carrier. UE-specific carrier may be different from the carrier of the network. Also, UE-specific carrier may not carry any synchronization signals, and may not include any anchor M-SB. The UE-specific carrier may be called UE-specific supported bandwidth. Control/data subbands may be configured across UE-specific supported bandwidth, and the guard band between UE-specific supported bandwidth may be indicated to the network, and/or may be avoided in scheduling or by rate matching/puncturing. Another approach is to separate control/data subbands configuration per UE-specific supported bandwidth. This may be viewed as that the UE-specific supported bandwidth is treated as the carrier from a UE perspective.

Figure 11:
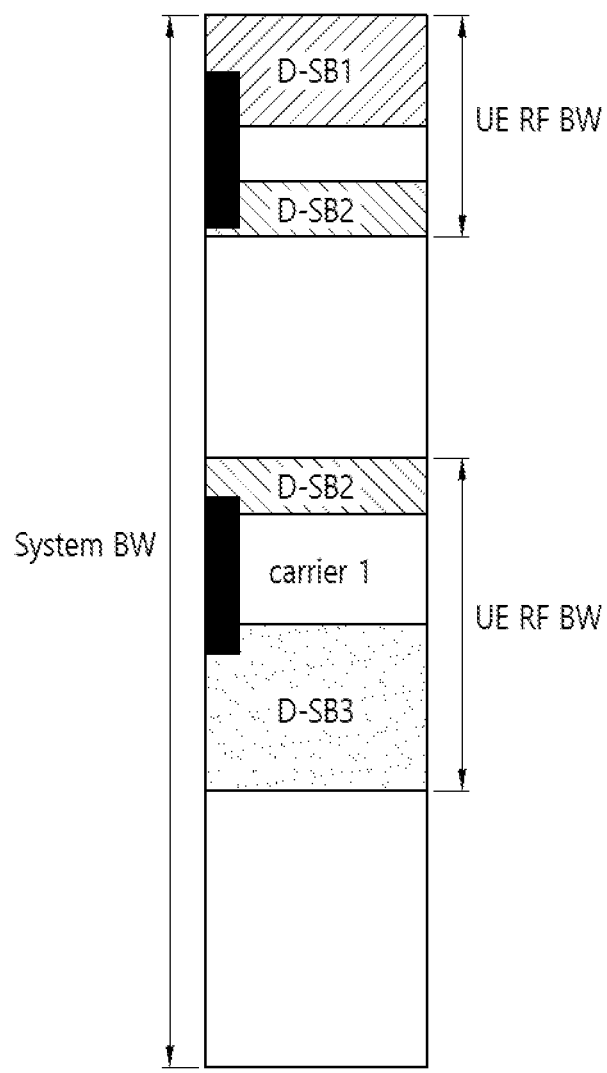
FIG. 11 shows an example of UE-specific supported bandwidth according to an embodiment of the present invention.

FIG. 11 shows an example of UE-specific supported bandwidth according to an embodiment of the present invention. Referring to FIG. 11, control/data subbands are separated per UE-specific supported bandwidth. More specifically, three data subbands are defined and one data subband (D-SB2) is across UE-RF BW or UE-specific supported bandwidths, and one control region is defined across both UE-specific supported bandwidth.

To determine UE capability, the network can use RF capability and baseband capability, and at least one of the followings may be considered.

A UE may indicate maximum supported RF capability per band separately from baseband capability. This may allow frequency region switching without retuning latency. The maximum supported RF capability may be predefined. Also, if UE RF requires resynchronization outside of N bandwidth, a UE may not be configured with any subband outside of N bandwidth (centered at the anchor M-SB) or additional synchronization signals/tracking RS may be transmitted in different subband.

A UE may indicate maximum support baseband capability per band

A UE may indicate intra-contiguous/non-contiguous CA capability per band. This capability may be used for subband aggregation within a carrier if the network supports larger bandwidth carrier than a UE can support with one RF components.

If a UE supports inter-band CA, the supportable baseband capability per band may be reduced. In other words, if a UE can aggregate baseband capability for different carriers to one carrier, the UE may report the aggregated baseband capability per baseband. For inter/intra-band CA, the total baseband capability may be indicated which may be divided to aggregated carriers by the network. If a UE cannot support flexible partitioning of capabilities between carriers, the UE may also indicate baseband capability per band for each band combination. For each band combination, supported RF bandwidth on each band may also be indicated.

NR UEs may flexibly share baseband capabilities between carriers (possibly except for fast Fourier transform (FFT)), mainly on control/data decoding capabilities. Thus, the total baseband capabilities may be indicated per band and band combinations which are shared, and may be partitioned by the network. If a UE cannot support flexible baseband capability sharing, the UE may indicate individual baseband capability per band in a band combination.

4. Resource Allocation

First, data subband configuration according to an embodiment of the present invention is described. Though frequency selective scheduling may be beneficial, a large TB may be scheduled across larger bandwidth to minimize control overhead. One of the mechanism to address this issue is to define subband in a nested manner. For example, two data subbands are formed and another subband which covers both data subbands may be formed.

As long as the scheduled TBS over the configured data subbands is less than the UE baseband capability, a UE may attempt to decode all data. Also, the size of data subband may be configured as $2^k*M$ PRBs, based on the minimum size M.

Second, resource allocation aspects within a data subband according to an embodiment of the present invention is described. A data subband may consist of contiguous or non-contiguous PRBs. The index of PRBs within system bandwidth (regardless of knowing the system bandwidth or not) may be known to the UE for the given data subband. For determining resource allocation bit size, the following approaches may be considered.

(1) The number of PRBs possible within a UE supported bandwidth may be used for resource allocation. If a UE can support wide bandwidth by multiple RF, regardless of RF activation status, the total bandwidth supported by the UE may be used. Otherwise, if it is smaller than system bandwidth, system bandwidth may be used.

(2) The maximum number of PRBs configured to a data subband for a given UE may be used for resource allocation for any DL control information. In case of non-contiguous PRBs, only configured PRBs may be counted. If RBGs are used for resource allocation, the maximum number of RBGs configured to a data subband for a given UE may be used for resource allocation. The motivation is to align the size of resource allocation field for all configured subbands.

(3) Each control region may be configured with the number of PRBs used in resource allocation field. This should be larger than the allocated PRBs, but it may be up to the network to determine the size.

(4) The same resource allocation size maybe kept by adapting resource block group (RBG) size in resource allocation. If data subband size is a function of $M*2k$, to keep the same size of resource allocation regardless of data subband size, RBG size may also be increased by 2k. If the data subband size is M, RBG size may be assumed as P. Then, it may increase by $P*2k$ if $M*2k$ is configured to the data subband size.

(5) In all cases, unused bits may be reserved, or may be used for some other purposes.

In terms of RB indexing, two approaches may be considered. Within each data subband, RB indexing may be done individually. Or, RB indexing may follow RB indexing of the system.

Figure 12:
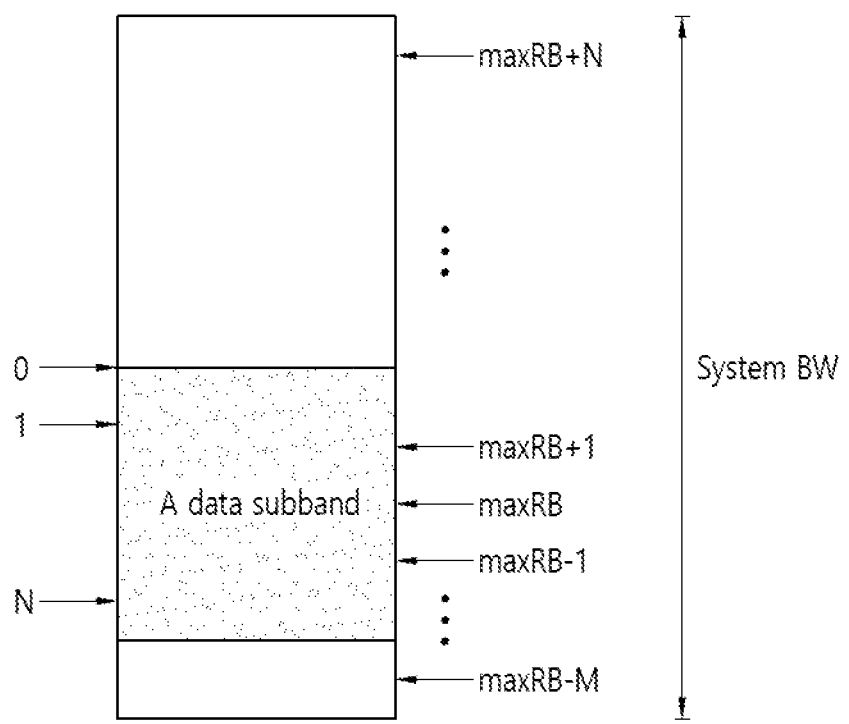
FIG. 12 shows an example of individual RB indexing according to an embodiment of the present invention.

FIG. 12 shows an example of individual RB indexing according to an embodiment of the present invention. However, individual RB indexing may lead ambiguity in terms of RB indexing between different UEs. Further, this approach may also confuse any common data mapping, and may degrade RS sequence performance, etc.

In this sense, logical PRB index, which may be mapped to 0, 1 . . . N (N+1 is the number of PRBs in a data subband) per each data subband, may be used. Logical PRB to physical PRB mapping may be continuously done if contiguous PRB is assigned for a data subband. For non-contiguous PRBs within a subband, a logical PRB index may be constructed as 1 . . . N (in ascending order) for each allocated PRB for resource allocation purpose. If virtual PRB is applied, the index may be used after physical PRB to virtual PRB mapping is applied. However, in terms of data scrambling, RS mapping, etc., physical PRB index should be used instead of logical index. Logical PRB index may be used only for resource allocation purpose.

Based on the logical PRB index, the following resource allocation mechanisms may be applied.

(1) RBG based resource allocation: RBG size may be defined by the size of data subband if it is contiguous. As mentioned before, RBG size may be defined proportional to the size of data subband. If it is non-contiguous, RBG size may be fixed or configured by the network. This may be applied to contiguous case. The RBG size configuration may indicate one set out of two sets (one set consists of RBGs sizes per bandwidth ranges). Based on the configuration, RBG size may be determined per each data subband.

(2) Compact resource allocation: As mentioned above, the field size may be determined by maximum of the configured subbands or maximum configured by the network or configured subband size.

(3) Contiguous resource allocation: Demodulation RS (DM-RS PRB) bundling size may be configured per UE or per subband or per control subband, if physical resources are non-contiguous within a PRB bundling based on logical PRB index. A UE may not assume the same precoding between non-contiguous PRBs. In other words, PRB bundling may not be applied across physically non-contiguous PRBs. For example, if logical PRB index 3, 4, 5 indicates PRB index 20, 21, 44, which are grouped as bundled PRBs for precoding, bundling may be applied only for PRB index 20, and 21. Alternative approach is to apply PRB bundling based on the bundle size on PRB rather than logical RB.

(4) Hopping: If hopping is enabled, hopping may be applied only within a data subband. Alternatively, if retuning latency is considered, hopping may also be applied within a carrier. More specifically, hopping bandwidth may be configured per each control subband (UE-specifically for USS, cell-specifically for CSS) or cell-specifically.

(5) Resource allocation type: If data subband is formed to utilize frequency selective scheduling, it may be generally desirable to schedule data rather contiguously at least within a RBG. In this case, it may be configured with resource allocation based on contiguous mapping (i.e. compact resource allocation). If a subband is formed across larger bandwidth, distributed scheduling may be useful. In that case, bitmap on RBGs may be used. Further, resource allocation type per subband may be configured regardless of transmission scheme used or DCI format used. However, if different resource allocation size is used with allocation type (e.g. resource allocation type 0 vs allocation type 2), it may lead different allocation size on a subband. If any subband is scheduled by a control subband, this may lead possibly different DCI size. One approach to address this is to use the same size resource allocation type scheduled by a control subband by restricting set of data subbands. Alternatively, resource allocation type may be configured per control subband, and it may be applied for subband scheduled by the control subband.

5. Dynamic Bandwidth Sharing with SB-Aggregation

For battery saving or efficient operation depending on the necessary data bandwidth, bandwidth for control/data reception/transmission may be adapted semi-statically or dynamically. One easy approach to utilize dynamic bandwidth sharing is to allocate anchor data subband or primary data subband (PSB). The anchor data subband or PSB may not be changed regardless of bandwidth adaptation (or, may change semi-statically). Further, supplemental or secondary data subband (SSB) may be dynamically aggregated or not aggregated. Subband size may also be changed dynamically. If SSB is allocated, which can be indicated by DCI, a TB may be mapped to anchor subband or SSB or both. In other words, a UE may be configured with more than one data subbands and one data subband size may be small and the other data subband size may be large. Switching between two may be done by DCI, such as indication of data subband in DCI. In terms of configuration of multiple data subbands, nested structure among configured data subbands may be considered.

As a UE may require time to adapt its bandwidth, another approach is to apply same-subframe scheduling for anchor subband, and cross-subframe scheduling for SSB. This may be applied only for the case that SSB is activated/added. More specifically, a UE bandwidth may be allocated for fixed subbands and variable subbands. Fixed subbands may not be changed, whereas variable subbands may be changed depending on data rate or cases. A separate TB may be scheduled in fixed and variable subbands, and scheduling on variable subbands (or SSB) may be activated dynamically via scheduling. In this case, to allow a UE to adapt its bandwidth, additional delay may be added between control and data (which may be done via cross-slot/subframe scheduling or adding a gap between control and data). If gap is not explicitly given, a UE may skip decoding of the first few OFDM symbols carried in variable subband(s). In this case, anchor subband may be treated as primary cell (PCell) in LTE CA, and SSB may be treated as secondary cell (SCell) in LTE CA. Similar mechanism used for SCell addition/ deactivation may be used for SSB activation/deactivation. However, this SSB may not carry additional synchronization signals, and synchronization may be done in anchor subband.

As mentioned above, for this case, control subband may be configured within only anchor subband (or, PSB). In this case, the control subband may carry control information of all subbands. Or, control subband may be configured across PSB/SSB or per each subband.

This is somewhat similar to CA case with self-carrier and cross-carrier scheduling. Accordingly, similar techniques used in CA may be applicable. However, if only one control subband within anchor subband is configured, depending on the activated SSB(s), different behavior on control channel monitoring may be considered as follows.

(1) Control subband size may be expanded (i.e. the number of CCEs may be increased) with more activated subbands. One approach is to expand in time domain to increase number of CCEs which may be done semi-statically or dynamically. If one control subband schedules one TB across multiple subbands, resource allocation fields in DCI may be increased accordingly, which may require more resources to transmit control channels.

Also, the increased control subband may be divided between multiple subbands. For example, hashing function in each subband may be used to determine the starting CCE to search (either per AL or same across AL). In other words, CCEs or search space may be divided between multiple data subbands. In this case, separate field on subband index may not be necessary as it may be differentiated by the candidate. If candidates for different data subbands collide, smaller subband index may have higher priority. In this case, the number of blind decoding may be (semi-) linearly increased with number of activated data subbands. Common data may be scheduled only via PSB, and thus, additional blind decoding on common data may not be used (similar to current CA). This may not be applied to all common data, but only to fallback and transmit power command (TPC) related common data.

(2) Control subband size may be kept as same with the increased number of blind decoding. As mentioned above, blind decoding may be increased with the number of activated subbands. In this case, as similar as above, search space may be separated among activated subbands (i.e. the above mechanisms may be applied in this case).

(3) Control subband size may be kept and the number of blind decoding may be kept as same. In this case, as mentioned above, subband index may be carried in DCI, or search space may be divided among multiple data subbands. If the number of blind decoding is relatively small, it is generally desirable to carry subband index in DCI. This option is to minimize UE complexity in term of blind decoding.

If one control subband schedules multiple data subbands, rate matching on control region may be applied only within one data subband. If a UE detects two DCIs schedule PSB and SSB, a UE may still assume data rate matching on control subband scheduling data. In other words, only resources used for the corresponding scheduling control may be assumed for data rate matching (in addition to semi-statically configured resources for rate matching). Alternatively, in each scheduling DCI, the number of scheduled PDSCHs across multiple subbands may be indicated, which may also be used for data rate matching purpose.

Figure 13:
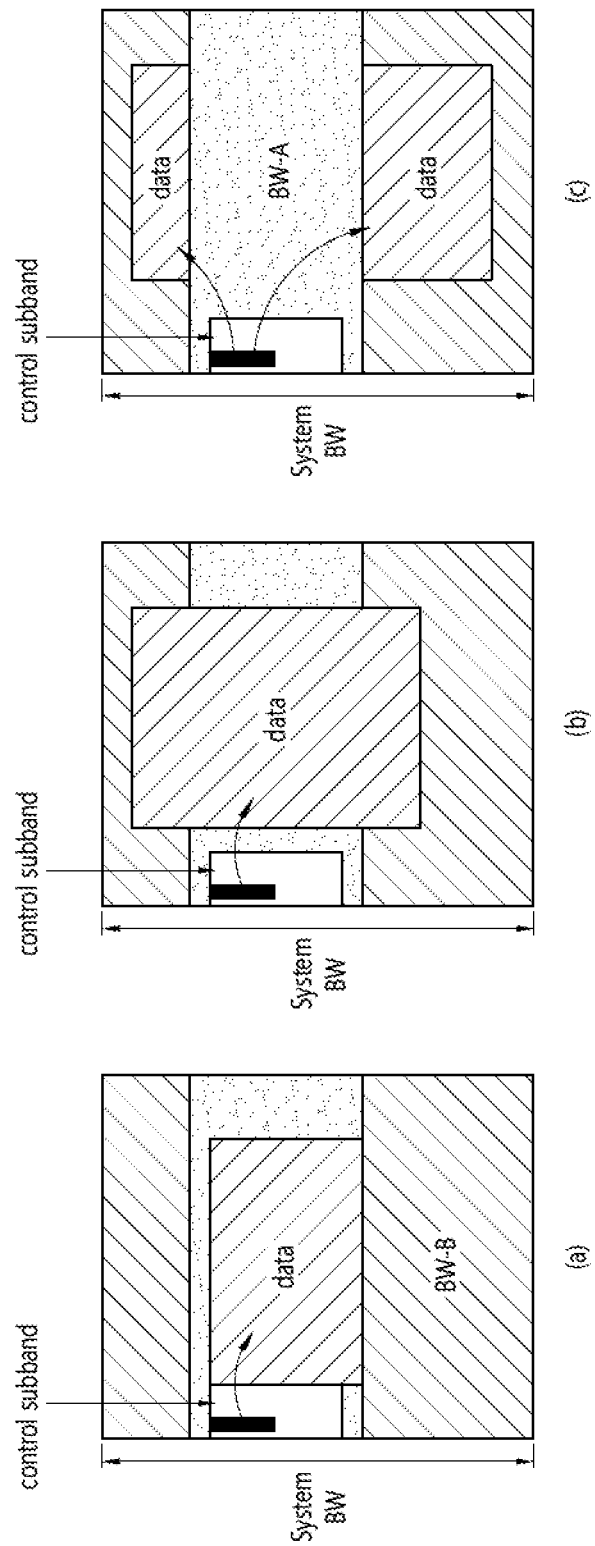
FIG. 13 shows examples of dynamic bandwidth adaptation via data subband aggregation according to an embodiment of the present invention.

FIG. 13 shows examples of dynamic bandwidth adaptation via data subband aggregation according to an embodiment of the present invention. Data subband mentioned in the present invention may be renamed as data-configured subband (D-CS). Referring to FIG. 13-(a), CA-like operation is utilized. Depending on traffic or power consumption requirements, a UE may be configured with one or multiple data subbands. The drawback of this approach is potential control overhead to separately schedule different TB per data subbands. As CA-like operation may be utilized, the impact of dynamic bandwidth adaptation may be simplified. For example, if a UE is configured with bandwidth-A for low traffic rate, and bandwidth-B for high traffic rate, two data subbands may be configured to a UE. First data subband may cover bandwidth-A, and the other data subband may cover bandwidth-B-bandwidth-A. In this case, bandwidth-B may be achieved via data subband aggregation.

Further, to minimize control overhead, another approach is to configure two data subband, and first data subband may cover bandwidth-A and the other data subband may cover bandwidth-B. In this case, two data subband may partially overlap. FIG. 13-(b) shows a case that two data subbands are partially overlapped and FIG. 13-(c) shows a case that two data subband are not overlapped. Depending on scheduling, a UE may determine which data subband is activated, and dynamically adapt its bandwidth.

Figure 14:
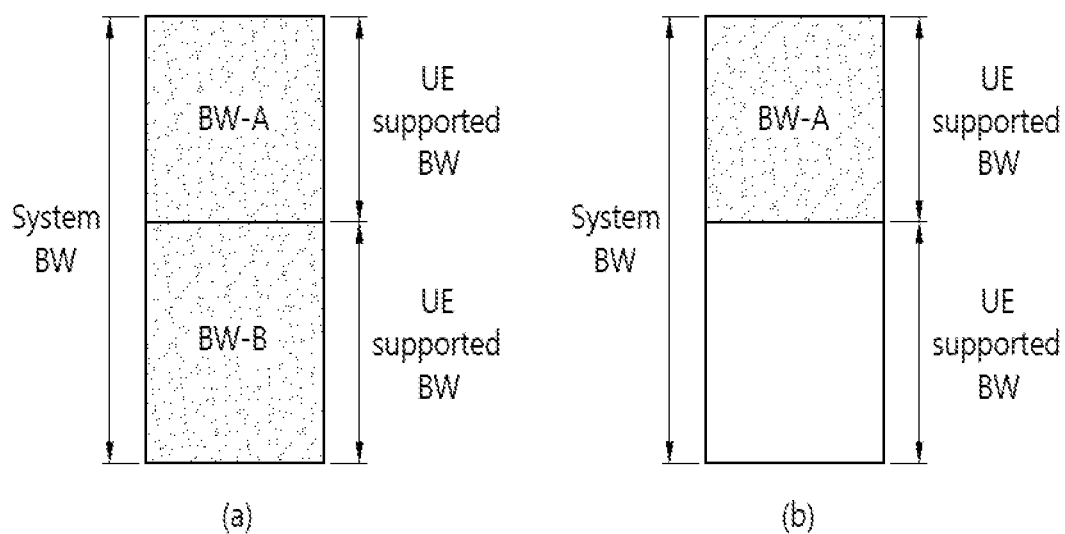
FIG. 14 shows examples of bandwidth adaptation via data subband aggregation with multiple RF according to an embodiment of the present invention.

FIG. 14 shows examples of bandwidth adaptation via data subband aggregation with multiple RF according to an embodiment of the present invention. If a UE supports wideband with multiple RFs in a NR carrier, one or more D-SBs may be turned on/off to adapt the overall data bandwidth.

6. Subband Aggregation Activation

For subband aggregation activation, similar approach used in CA may be used (i.e. via media access control (MAC) control element (CE)). If subband size is also dynamically changed, this activation message may also include the size of activated subband. Different from CA, subband aggregation may not require radio resource management (RRM) measurement on the aggregated subband. However, it may be necessary to obtain CSI feedbacks on candidate subbands where one or more subbands (partially or fully) can be activated. In this sense, aperiodic widesubband request may be triggered for the configured subbands. In other words, a UE may be configured with a list of potential subbands and a UE may be required to perform aperiodic CSI measurement which may be based on oneshot or based on aggregated measurements. Aperiodic CSI request may be requested on one or more configured subbands, and for the deactivated subbands, only wideband CSI measurement within the subband (i.e. wideband channel quality indictor (CQI)/precoding matrix indicator (PMI) over the entire subband) may be reported. If a UE RF does not support CSI measurement without RF retuning/adaptation, additional and/or shared (with inter-frequency) measurement gap may be required. Before activating a subband, wideband CSI report may be expected generally, and a UE may have to adapt its RF to perform CSI measurement. Thus, generally, the processing time between aperiodic CSI trigger to report on deactivated subbands may be longer than aperiodic CSI processing time on activated subbands, unless deactivated subbands' CSI are also periodically measured.

7. Reconfiguration of Data Subband

When a UE is configured with additional data subband within a UE RF bandwidth, depending on subband configuration, it may be sometimes necessary to retune its center frequency (receiver center). If frequency retuning is needed, sufficient gap may be needed. For one approach to allow this gap, time between the end of PDSCH which carries reconfiguration message and the start of next may be used for retuning gap. If a UE is scheduled with any UL in that gap, a UE may drop any UL for retuning. To minimize the gap, it is generally desirable to keep the center frequency unchanged if data subband is changed dynamically or a UE is allowed to change its RF bandwidth for data reception/transmission. In order to mandate this indirectly, resource blocks for resource allocation may always be configured in a nested manner based on the first semi-statically configured data subband. For example, a UE may be dynamically configured with data subband size between [M, 2*M, 4*M, 8*M . . . ] PRBs, where M is the minimum size of data subband. To minimize control subband change, control subband may be formed within M PRBs. To keep the resource allocation field intact regardless of data subband bandwidth adaptation, RBG size may be increased with the increased data subband size.

Figure 15:
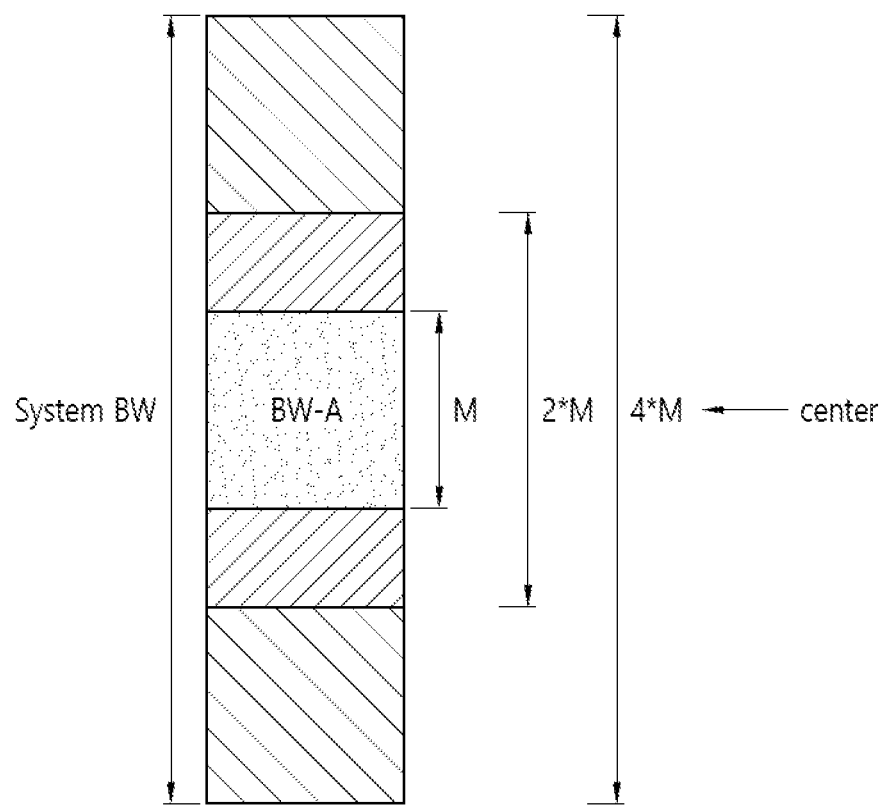
FIG. 15 shows an example of resource allocation in a nested manner according to an embodiment of the present invention.

FIG. 15 shows an example of resource allocation in a nested manner according to an embodiment of the present invention. Referring to FIG. 15, a UE is dynamically configured with data subband size between [M, 2*M, 4*M] PRBs, where M is the minimum size of data subband. This may be preconfigured as possible patterns, and one of patterns may be dynamically or semi-statically indicated. In case of dynamic indication, which pattern is used or which data subband bandwidth size is used may need to be dynamically indicated. If a UE is dynamically configured between BW-A (M PRBs), and BW-B (4*M PRBs), one bit may be added to DCI to indicate which size is being currently used for data scheduling. If a UE does not need any retuning, instantaneous RF spanning may be assumed. Otherwise, some gap for retuning latency may be assumed.

The size of data subband may be semi-statically changed as well. With semi-static change, fallback messages may be scheduled based on minimum data subband bandwidth size for resource allocation, or based on default data subband bandwidth size configured or indicated by the network. In other words, during reconfiguration, or DCI scheduled on fallback, search space may assume different data bandwidth for resource allocation. For example, minimum size of BW-A (M PRBs) may be used for fallback signaling. When semi-static change of data subband size occurs, necessary reconfiguration of semi-static resources may also be necessary, particularly for resources configured with offset value based on the bandwidth (e.g. PUCCH resource offset). Also, for example, bandwidth of wideband CSI-RS may need to be adapted. The bandwidth may be determined by DCI if dynamic change is adopted, and semi-static adaption may be achieved when semi-static reconfiguration is applied. Once reconfiguration is done dynamically or semi-statically, RB indexing (if RB indexing starts from the lowest frequency) may be changed. In that sense, during fallback operation or reconfiguration, particularly when data subband size is changed, it is not desirable to schedule fallback message (e.g. RRC configuration message) with user data.

8. CA Handling

If multiple carriers are present, from a UE perspective, one data subband may be configured across multiple carriers or within one carrier. Furthermore, more than one data subband may be configured with a UE-specific bandwidth. If multiple data subband is configured in UL, as different TTI may be configured or different RAT is configured, the mapping of DL data subband and UL data subband may be necessary. Accordingly, the following options may be considered.

(1) Any DL data subband may be mapped to a UL data subband. All uplink control information (UCI) corresponding to any DL data subband may be transmitted in any UL data subband.

(2) UL data subband may be divided into a few groups. All UCI corresponding to any DL data subband may be piggybacked to PUSCH of any UL data subband. In case of PUCCH transmission, DL data subband may be grouped as well and each group between DL data subband and UL data subband may be mapped.

(3) UL data subband and DL data subband may be grouped and a DL data subband group may be mapped to only one UL data subband group. UCI piggyback, PUCCH transmission, CSI trigger, etc., may be handled within each UL data subband group.

9. RRM Handling

When the system bandwidth is wider than the UE supported bandwidth, the following two approaches may be considered for RRM.

(1) Subband approach: A network configures/operates one wideband carrier, and a UE may monitor one or multiple subband(s).

(2) Carrier approach: A network configures multiple narrowband carriers, and a UE may be configured with one or multiple carriers, like intra-band CA.

When the subband approach is considered, the following aspects should be clarified in each subband where a UE is configured to monitor for DL.

Whether CSS is configured separately per each subband

Whether synchronization signal is transmitted per each subband

Whether measurement RS is transmitted per each subband

Whether tracking RS is transmitted separately per each subband

Whether PBCH and/or SIB is transmitted separately per each subband

Whether RACH procedure can occur within each subband

Whether resource allocation is restricted within a subband

When the subband approach is considered, three options may be further considered for SS block transmission as follows.

(1) Each subband may carry SS block and any SS block may be accessed by stand-alone UEs.

(2) Only anchor subband may carry SS block. There may be one anchor subband across multiple carriers, i.e. one carrier may not carry SS block.

(3) Whether each data subband may carry SS block may be based on configuration. From a UE time/frequency synchronization perspective, a UE may assume that the SS block in initial access may be used for the reference, until it is handed over to another SS block.

If option (1) is used, SS block transmission overhead may be added, particularly if small interval is used for synchronization signal periodicity. Also, as different UEs can access different SS blocks, some information on PBCH and/or SIB may need to be different per each subband. For example, if the offset of center frequency of the system bandwidth and center frequency of the SS block is indicated, the value may be different per each subband. While option (1) adds some burden, it may simplify UE measurement, particularly for neighbor cell measurement.

If option (2) is used, to support RRM measurement for UEs in different subband from the anchor subband, it may be necessary to transmit additional signals for cell detection and measurements. However, compared to option (1), at least different frequency of SS block transmission or additional transmission may be considered (e.g. sparser transmission). If there are UEs in a subband which are not capable of monitoring CSS configured in different subband or anchor subband, CSS may be additionally configured if the subband approach is used.

It is described that thee options mentioned above are applied to the subband approach. However, three options may also be applied to the carrier approach. Even with carrier approach, only anchor carrier may carry the SS block for initial access, and other carrier may transmit additional signaling similar to the subband approach.

When the subband approach is used, it may efficiently handle UEs supporting larger bandwidth than the bandwidth of a subband. For such UEs, multiple subbands may be configured and one TB may be mapped to one TB.

When a UE is equipped with multiple RFs for supporting wider bandwidth, both subband approach and carrier approach may be considered. In LTE, the case has been supported by intra-band CA. As discussed above, each subband may carry necessary synchronization and RRM RS, and possibly PBCH/SIB transmissions. In that sense, either by subband or carrier approach, similar overhead may be expected by supporting the followings.

From the network operation perspective of a wideband, the network may define an anchor subband/carrier where SS block for initial access is transmitted. In other subbands, additional signals may be transmitted for measurements if there are UEs requiring transmission.

From a UE perspective, regardless of whether the network utilizes subband approach or carrier approach, the UE may be configured with one or multiple of data subbands. This may be efficient at least if the network manages multiple carriers with the anchor carrier and supplemental carrier to minimize initial access overhead or the network operates different numerologies in different frequencies.

Figure 16:
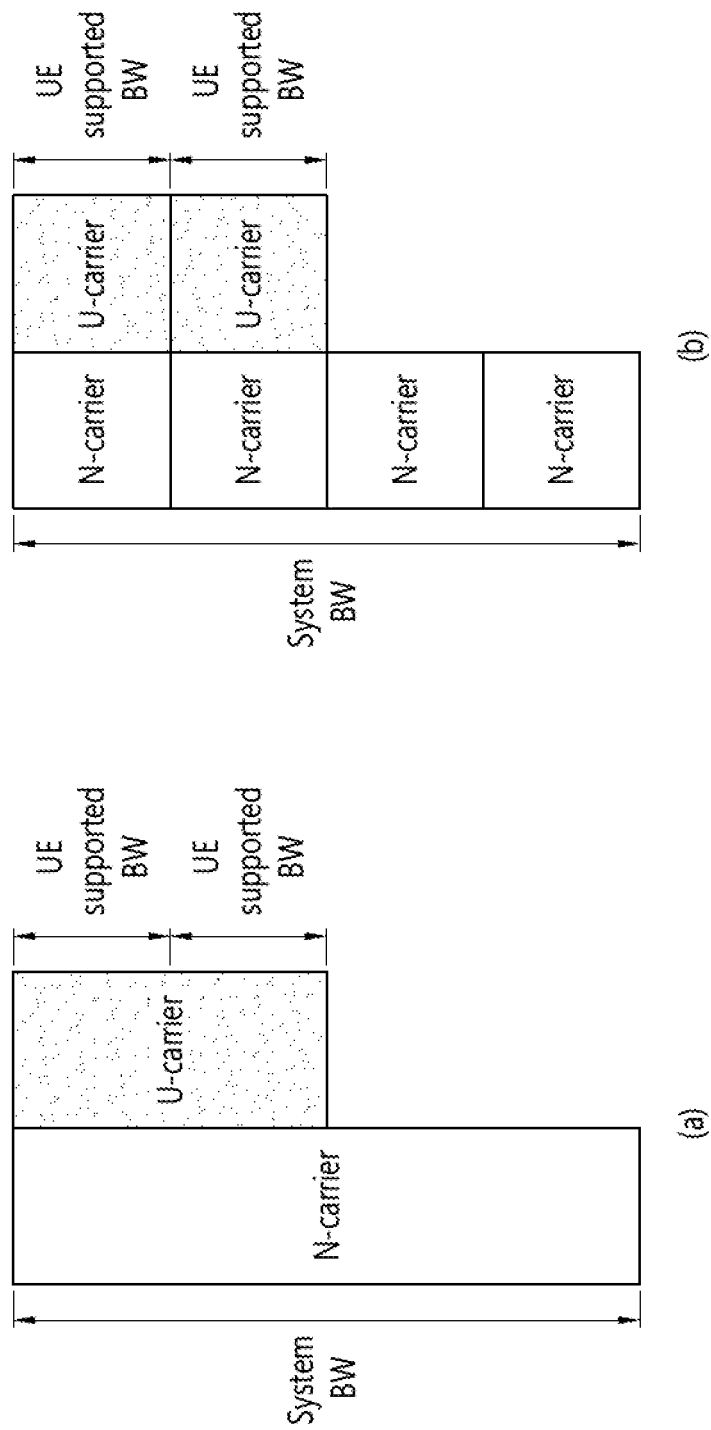
FIG. 16 shows an example of different handling options for wideband spectrum with narrowband UE RFs according to an embodiment of the present invention.

FIG. 16 shows an example of different handling options for wideband spectrum with narrowband UE RFs according to an embodiment of the present invention. In FIG. 16, for the convenience, a component carrier defined by the network (or from the network perspective) is called N-carrier. Also, a component carrier defined by the UE (or from the UE perspective) is called U-carrier. FIG. 16-(a) shows mapping between N-carrier and U-carrier for multiple RF over single wideband. FIG. 16-(b) shows mapping between N-carrier and U-carrier for multiple RF over multiple narrowband.

10. Single Data Subband Mapping with Multiple RF

As discussed above, one data subband may be configured to span a single or multiple UE RF bandwidth. As the UE is equipped with multiple RF, some issues related to phase continuity and/or power amplifier may need to be clarified. If a UE can support reception of data with phase continuity regardless of actual RF, the UE may indicate its capability. In terms of capability, whether a UE can support wideband via multiple RFs or not may be indicated. Baseband capability may not support this operation. In this case, a UE may need to inform that each RF supports a certain bandwidth, multiple RFs can support multiple of narrowbands, and each narrowband is supported by one RF. This is similar to CA from a UE perspective. For UL, some considerations needs to be addressed.

(1) If a UE is configured with discrete Fourier transform (DFT)-spread-OFDM (DFT-s-OFDM), as the UE may need to perform spreading separately per RF, whether a UE can support multiple DFT-s-OFDM simultaneously or not may be indicated. In case of separate RF, separate handling on potential DC may be necessary and a UE may indicate a set of potential DCs for each RF. Or, a UE may indicate potential multiple DCs considering multiple RFs. If a UE supports simultaneous UL transmissions, the network may schedule one or multiple TBs across multiple UL resource regions which may be handled via one or multiple RFs. The set of RBs transmitted via one RF may need to be informed to the network or to other UEs (e.g. in sidelink operation). This may be necessary particularly when channel estimation or PRB bundling is assumed and PRB bundling would not cross the RF boundary.

(2) If a UE is equipped with separate power amplifier in two RF, the power split between two RFs may be necessary which may be independently configured/indicated by the network. If the network schedules one TB over multiple RF transmissions, the following approaches may be considered.

The parameters of power control may be applied commonly across the RFs, the power assigned in each power amplifier or RF may be determined by the common power parameters with the allocated RB within the RF bandwidth or RBs covered by the RF. If power limited, power scaling or dropping may occur based on priority, such as UCI type.

The parameters of power control may be configured separately and the power assigned in each power amplifier or RF may be determined by the independently configured parameters with the allocated RB within the RF bandwidth. This approach makes more sense when separate UL transmission is configured by the network and power control is performed independently per RF. To support this, one DCI or one UL grant may indicate different TB across different PRBs. Separate configuration on DM-RS may also be considered. If separate power control is used, separate TPC command may also be necessary.

(3) Control Channel Monitoring

For better channel estimation, one control resource set may be confined within one RF bandwidth. Further, multiple control resource sets may be configured for multiple RFs. Even if it allows a control resource set to be mapped over multiple RFs, at least one control resource set or control resource set for common search space may be confined within the primary RF bandwidth. This is to minimize ambiguity of control monitoring subframe regardless of activation/deactivation of RFs other than the primary RF. If a control resource set spans multiple RFs, search space may be constructed so that at least partial candidates can be located within the primary RF bandwidth. This may be done e.g. by not distributing adjacent (logically) CCEs across different RFs. In other words, when CCEs are distributed, it may be distributed within one RF bandwidth. As common search space or group-common search space is shared by multiple UEs which may have different RF bandwidth supported, it may need to be clarified how each UE can access or how search space is configured. The following approaches may be considered.

- Group common search space may be configured within the smallest RF among UEs which share the same search space. If USS and C/GSS shares the same control resource set, only partial bandwidth may be shared between USS and C/GSS. To support this, control resource set may be virtually divided into fixed and variable resource set, and CCEs may be mapped independently between fixed and variable resource set, and possibly different transmission scheme may also be considered between two different resource regions. Alternatively, CCEs may be mapped in a way that only the first M CCEs are mapped within the smallest RF bandwidth region where a set of candidates are restricted for C/GSS, whereas USS can be mapped over the entire control resource set.
- Group common search space may be configured within the nominal RF which is defined in the specification or by configuration, and a UE supporting less bandwidth than the nominal RF may not be able to access some search space candidates or have restriction.
- Separate group common search space may be configured per different bandwidth UEs. The UEs sharing the same search space may have the same RF bandwidth capability at least from the control monitoring perspective.

(4) Data Mapping

One TB may be mapped over multiple RF bandwidth. However, one DCI, which can schedule two different TBs or multiple TBs, may be transmitted over multiple RFs. In other words, one DCI may schedule separate resource allocation for different bandwidth with different RF. Alternatively, resource allocation may be done based on the single RF bandwidth and the same resource allocation may also be applied to different RF. For example, if resource allocation schedules PRB 1 to 15 for one RF, it may be assumed that the PRB within the RF is allocated to the UE. If it is configured to apply the same resource allocation to different RFs, it may be assumed that PRB 1 to 15 for each RF is also allocated to the UE. To support this, each DCI may carry N bits, where N is the number of RFs except for the primary RF which are activated. Further, whether the same resource allocation is applied or not may be indicated via the bitmap.

Alternatively, resource allocation may be done based on the aggregated bandwidth by the multiple RFs. In this case, resource allocation by common search space or group common search space may be restricted within the bandwidth covered by primary RF. The similar restriction may also be applied to the case of bandwidth adaptation even with single RF. In this case, CSS may be restricted to the minimum bandwidth, and resource allocation by CSS may be restricted to the configured bandwidth or minimum bandwidth to avoid ambiguity. In other words, the bandwidth in each search space may be different. Further, different bandwidth per each search space or control resource set may be configured as well. To minimize the overhead, compact resource allocation may be used for contiguous resource allocation, or different RBG may be considered depending on the configured RFs or the aggregated bandwidth. In other words, even though the system bandwidth is same to all UEs, depending on the supported bandwidth by each UE, RBG size may be different and RBG sizes among different bandwidth may also be multiple values of each other (e.g. RBG size is 2 PRBs for 5 MHz, 4 PRBs for 10 MHz, 8 PRBs for 20 MHz, and so on).

(5) PUCCH Transmission:

If distributed mapping for PUCCH is supported, PUCCH transmission may be confined within one RF regardless of the aggregated bandwidth supported by the UE. This is mainly useful if DFT-s-OFDM is used. However, even with OFDM, this may be beneficial for power control, etc. In other words, PUCCH resource may be configured differently based on RF information from each UE. If PUCCH is transmitted only via primary RF, the PUCCH resource configuration may be confined within primary RF bandwidth. Alternatively, PUCCH resource mapping may occur across multiple RFs, in which long PUCCH with low peak-to-average power ratio (PAPR) may not be easily supported or simultaneous transmission capability may be necessary. Further, a UE may support DFT-s-OFDM and OFDM simultaneously via different RF which may be indicated to the network. This may be efficient if simultaneous UL transmission to different gNB or transmission/reception points (TRPs) are supported and one may require coverage and the other may require efficient multiplexing. If the UE does not support simultaneous transmission of two waveforms, one waveform may be configured semi-statically or dynamically. Long PUCCH and short PUCCH may also be transmitted simultaneously regardless of waveform used. Cross-UCI piggyback among different RF may also be supported.

(6) PRACH Transmission

Multiple RF reception may be enabled by UE-specific higher layer signaling. In other words, Multiple RF reception may be activated when a UE is in RRC connected state. If multiple RF is enabled even before RRC connected state, a UE should support seamless/transparent transmission/reception. In this case, PRACH resource may be confined within a UE minimum bandwidth so that all UEs can transmit PRACH with single RF. Or, different PRACH resources may be configured with different PRACH bandwidth.

(7) CQI Transmission

Subband partitioning may be constructed based on the aggregated wideband bandwidth. Single wideband CQI may be indicated over the wideband. However, partial wideband CQI may also be configured/transmitted which is averaged over the RBs covered by a single RF. This is particularly useful if different RF supports different numerology.

(8) Bandwidth Adaptation

If bandwidth adaptation is achieved and the aggregated bandwidth is smaller than the maximum bandwidth covered by single RF, a UE may deactivate other RFs other than the primary RF. In terms of bandwidth adaptation, based on the knowledge of UE RFs, the network may also indicate the required number of RFs and its intended center frequency. In other words, when bandwidth adaptation is applied, first, a UE may be activated or deactivated with secondary RF (It may also be possible to activate/deactivate third or fourth RF as well). In terms of activation/deactivation, MAC CE and/or RRC and/or dynamic signaling via DCI or separate signaling may be used. Another approach is to leave this up to UE implementation and no explicit activation/deactivation of RF procedure is supported. Depending on monitoring bandwidth, a UE may switch off or on some of RFs. In this case, depending on UE capability signaling on bandwidth, the network may determine the bandwidth that the UE can support/can be configured with.

Bandwidth adaptation may occur without knowing the details of RF layout of the UE. In this case, maximum RF switching delay including retuning and activation/deactivation should be considered for bandwidth adaptation. Generally, if RF activation is required for bandwidth adaptation, it may also include code-start, which may require more than a few milliseconds. In this sense, it is desirable that the network knows or explicitly indicate whether to deactivate RF or not. If dynamic adaptation is used, the UE may not turn on or off the RF. Alternatively, if a UE turns on the RF to increase RF, a UE may drop receiving some data during the activation. Alternatively, when bandwidth adaptation is indicated, a UE may response with the required latency to support the operation. Primary RF may not be turned off anytime, unless a UE is in discontinuous reception (DRX) cycle.

For reducing bandwidth, one or more RFs may be deactivated. This may be done via RRC or MAC CE or dynamic signaling. Further reduction of bandwidth may be done within primary RF. In other words, smaller bandwidth adaptation within a RF may occur only within a primary RF. This procedure may be common between UEs with one or multiple RFs. For increasing bandwidth, at first, bandwidth may be increased within primary RF. When further increase is necessary, activation of one or more RFs may be considered. When activating one or more RFs, a UE may be configured with the bandwidth monitored by each RF which may be equal to or smaller than UE RF bandwidth. For example, if a secondary RF supports 200 MHz, the UE may be configured with only 100 MHz for data monitoring. Increasing/decreasing within primary RF may be done via dynamic signaling, whereas increasing/decreasing of additional RF may be done via MAC CE/RRC signaling.

(9) HARQ Buffer May be Shared Between Different RFs.

(10) RRM Measurement

Unless otherwise noted/configured, RRM measurement may occur once for the configured resource for the wideband carrier. Alternatively, RRM measurement may occur for each RF and different frequency region may be configured per each RF. Wideband measurement across multiple RF may also be considered and aggregated/average RRM measurement over multiple RF may be reported, or separate/individual RRM measurement may be reported per RF.

Alternatively, RRM may only be supported in primary RF. Primary RF may perform RRM measurement on the serving cell, and secondary/multiple RFs may be used for inter-frequency measurement. For serving cell measurement or connected measurement for intra-frequency measurement, frequency region may be used only for primary RF and the measurement bandwidth may be configured to equal to or smaller than the primary RF bandwidth.

(11) Fallback

If RF is activated or deactivated and one TB can be mapped over multiple RFs, during activation or deactivation, ambiguity may occur as the network does not know when the UE is ready or finish the activation. In this case, if multiple RFs are utilized, primary RF may be assigned where the bandwidth for scheduling via CSS or group-common SS may be fitted within the bandwidth supported by the primary RF. If primary RF bandwidth is changed, minimum bandwidth assumed not to be changed may be used for CSS scheduling. For example, a UE has two RFs with 100 MHz each, and one RF may be defined as a primary RF. In this case, the resource allocation bandwidth via CSS for that UE may be equal to or smaller than 100 MHz. In other words, at least one RF may always be activated and fallback bandwidth may be smaller or equal to the primary RF bandwidth. After DRX, only one RF may be activated, and monitoring on control during On_duration may be limited to the bandwidth of one RF. If activation/deactivation of RF is done via network indication, the bandwidth/PRBs where each RF is monitoring may be indicated. Further, the primary RF and its monitoring PRBs should be negotiated or informed to the network so that the network would not perform turning of all PRBs of the primary RF. Or, fallback message may be delivered to the primary RF bandwidth.

(12) Tracking

Tracking RS may cover multiple RFs used by the UE. If tracking RS is transmitted in subband, multiple subband transmission may be used for tracking RS transmission so that each RF can acquire tracking RS from each monitored subband. However, different periodicity and/or time/frequency resource may be used for tracking RS transmission in different bandwidth/subbands.

(13) Radio Link Failure (RLF)

RLF may be performed based on the total bandwidth supported by multiple RF. Or, RLF may be performed based only on primary RF. RLF may be performed only within the bandwidth configured for control resource set. If multiple control resource sets are configured for one UE, the resource set where common search space or group common search space is monitored may be used for RLF measurement. If only partial bandwidth within the control resource set is used for C/GSS, RLF may be further restricted to such PRBs where C/GSS candidates can be mapped.

Different options of each functionality described above may be configured by the network via higher layer. Further, different mechanism between single carrier vs multiple carrier may be considered between DL and UL, respectively. In other words, a UE may support different RF bandwidth for DL and UL respectively, or even if a UE supports homogeneous RF bandwidth for DL and UL, the configuration may be different as the network maintains the system bandwidth differently between DL and UL.

11. Emission Handling

When UL transmission is scheduled over multiple RFs, necessary emissions should be considered. If a UE performs transmission in the configured RBs, it can have adjacent channel selectivity (ACS), in-band emission, and out-of-band emission. This issue may occur in both single RF with smaller bandwidth than a system bandwidth either by bandwidth adaptation or by UE capability, and multiple RF where one scheduling may span more than one RFs.

(1) Case 1: Small Bandwidth Transmission

Figure 17:
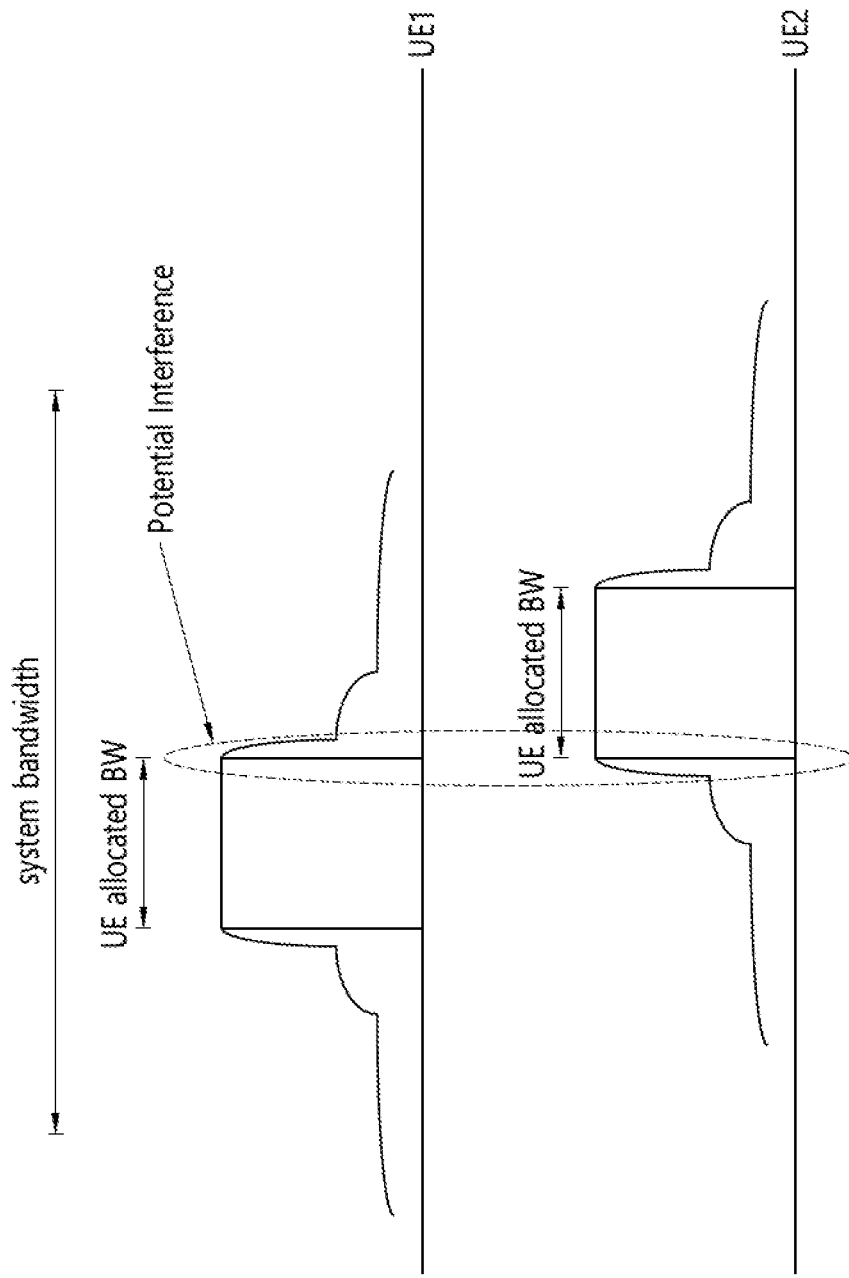
FIG. 17 shows an example of interference in case of small bandwidth transmission.

FIG. 17 shows an example of interference in case of small bandwidth transmission. Referring to FIG. 17, different bandwidth may lead high interference from emission from other UEs, when different UEs are utilizing different portions of bandwidth within a system bandwidth.

To address this issue, the following mechanisms may be considered.

> Based on network scheduling: The network may not schedule to create guard-band between two UEs. For example, UE2 may not be scheduled in PRBs where high interference from UE1 is expected. If RB level or RBG level indication is supported, scheduling indication may be sufficient. If contiguous resource allocation is used, explicit data rate matching may be indicated.

For explicit rate matching, various approaches may be considered. First, assuming guard-band size of K MHz in each side of transmission bandwidth, rate matching for either one or both may be indicated. This mechanism makes guard-band in the transmitter side by scheduling more RBs than the required in consideration of guard band. Alternatively, whether to assume implicit guard-band within a transmission bandwidth may be configured semi-statically. Instead of dynamic indication of creating guard-band, another example is to always create guard-band within the allocated transmission bandwidth. This approach may unnecessarily lead unused resource even if there is no adjacent PRB transmission by another UE. Also, if a UE supports the system bandwidth, this may create additional unnecessary guard-band. To avoid such a case, system bandwidth may be mapped over the entire carrier bandwidth assuming no guard-band for UL transmission, and guard-band may be implicitly created depending on UE capability. To successfully receive the data, the network needs to know guard-band required for a UE. Alternatively, guard-band may be explicitly indicated by indicating that one or more RBs are rate matched. By this mechanism, a UE may perform rate matching on one or more RBs as if they are reserved resources.

> Guard-bands may be configured per each subband. Assuming that UL bandwidth is divided into a set of subbands, guard-bands may be configured per each subband and a UE may assume no data mapping on those guard-bands regardless of configured bandwidth. One drawback of this approach is that depending on the configured bandwidth, the required guard-band may be different, and thus, depending on actual transmission bandwidth, the configured guard-band may or may not be sufficient.

> Different modulation and coding scheme (MCS) may be configured in different region by configuring separate region with MCS. As data mapped in PRBs which may be interfered by another UE, one approach is to map data with lower MCS or higher power. In other words, different MCS may be configured in different PRBs or different power may be configured in different PRBs by scheduling.

PRACH transmission or PUCCH transmission should not be affected by guard-band of a UE. One approach is to configure PRACH, PUCCH resource where any guard-band is not mapped. For example, if the network divides the system bandwidth into a set of subbands, and a UE's RF bandwidth is one or multiple of subbands, guard-bands may be created around boundaries of subband. Thus, PRACH and PUCCH resources may be configured within a subband, i.e., by not passing through subband boundaries to avoid impacts from potential guard-band of another UEs. In terms of PRACH/PUCCH resource configuration, the offset may be given per each subband. In other words, configuration may be given in {subband index, offset within a subband}. If two pairs of resources are necessary for PUCCH to allow frequency hopping, two sets of {subband index, offset} may be given, and the offset may be applied from the lowest frequency for lower subband index, and highest frequency for higher subband index.

(2) Case 2: Multiple RFs

Figure 18:
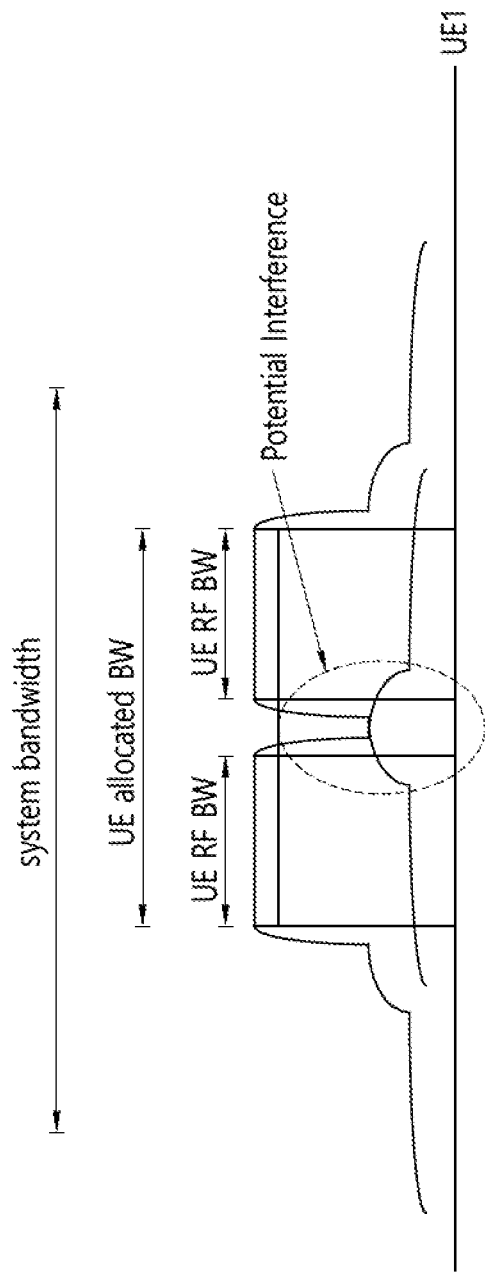
FIG. 18 shows an example of interference in case of multiple RFs.

FIG. 18 shows an example of interference in case of multiple RFs. That is, interference may be caused by another RF within the same UE if larger bandwidth than the supported bandwidth by single RF is scheduled.

To address this issue, the following mechanisms may be considered.

> A TB may not be mapped over bandwidth more than one RF's bandwidth. In other words, to utilize larger bandwidth than single RF bandwidth, more than one TBs may be used for the given UE.

> A UE may assume that data is rate matched or punctured in the needed guard-band. The needed guard-band may be either specified in the specification or signalled by the UE. In other words, effective RBs used for transmission may be restricted excluding the required guard-band. If a UE changes guard-band dynamically, a UE may indicate the used guard-band in PUSCH transmission. Alternatively, the network may indicate the guard-band usable for data transmission.

> As it is difficult to assume or rate matching on PRACH and PUCCH, PRACH and/or PUCCH may not be scheduled over multiple RFs simultaneously. It is possible that PUCCH is transmitted in one RF in one slot whereas in another slot in another RF to realized frequency hopping. If PRACH or PUCCH is configured within the subband as mentioned above, this may be avoided by restricting UE bandwidth aligned with subband configuration.

Assuming that subband configuration is given and a UL bandwidth is configured with one or more subbands, it is also possible that the center of each subband may be potential DC carriers without explicit signaling. In such center, DM-RS may not be mapped. To minimize impact on DFT-s OFDM transmission, the DC may always be the first or last subcarrier of each subband.

Techniques for the single RF case mentioned above may be applied to multiple RFs case.

12. Handling Different Maximum RF Bandwidth UEs

If multiple RFs are used and the network employs wide system bandwidth, the following options may be considered for UE RF bandwidth.

(1) UE RF bandwidth may be fixed. For example, UE RF bandwidth supporting multiple RFs to support wider bandwidth than the maximum bandwidth of a RF may be 100 MHz.

(2) UE RF bandwidth may have more than one candidate values, e.g. {50 MHz, 100 MHz, 200 MHz}. For example, depending on UE capabilities, to support 400 MHz system bandwidth, some UE may require 8 RFs, some UEs may require 4 RFs and some other UEs may require 2 RFs. However, RF bandwidth supporting intra-contiguous wideband may be common from a UE perspective.

(3) UE RF bandwidth may have more than one candidate values e.g. {50 MHz, 100 MHz, 200 MHz}, and each UE may be equipped with multiple RFs with different bandwidth supported. For example, a UE may support 50 MHz*2 RF and 100 MHz*1 RF and 200 MHz*1 RF.

Regardless of which options are considered, for better management, the candidate RF bandwidth may be constructed in a nested manner, e.g. {M MHz, M*2 MHz, M*4 MHz . . . }. The idea is to construct minimum system bandwidth subband, and support different UE RF bandwidth by aggregating multiple minimum system bandwidth subbands.

For handling different RF bandwidth UEs, the following approaches may be considered.

(1) All UEs may be treated with equal priority so that all configuration are based on the minimum UE bandwidth. This may be applied to RRM measurement requirements, common or group common search space, neighbour cell measurement, RLF, etc. If this option is used, a UE supporting larger bandwidth than the minimum bandwidth may achieve better performance compared to the minimum bandwidth UEs by reconfiguring RRM measurement bandwidth and/or other configurations.

(2) UEs with different bandwidth may be treated differently. For example, RRM measurement requirement may be different based on UE supported bandwidth. For example, RRM measurement duration or the required duration to report RRM measurement may be relaxed based on the supported bandwidth. Overall RRM measurement requirement may be based on the nominal bandwidth.

(3) Separate bandwidth or subbands may be allocated and one subband may be allocated to UEs with the same RF bandwidth only.

(4) Overlaid structure in which different subbands are constructed based on possible UE RF bandwidths may be configured. A UE may be assigned one subband based on RF bandwidth.

Figure 19:
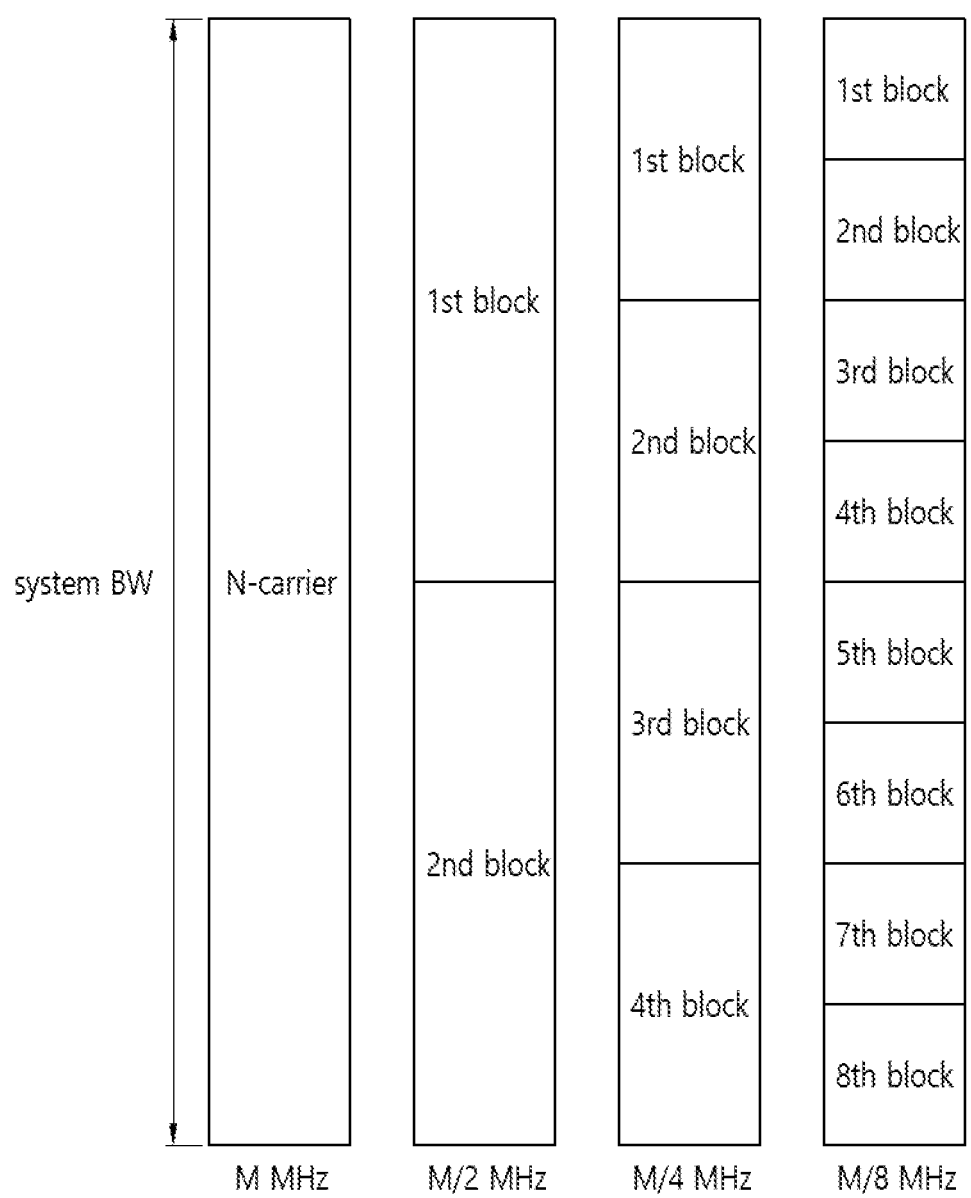
FIG. 19 shows an example of overlaid structure according to an embodiment of the present invention.

FIG. 19 shows an example of overlaid structure according to an embodiment of the present invention. Referring to FIG. 19, the system bandwidth can be divided into different bandwidth subbands and each UE may be configured with {bandwidth class, subband index}. Bandwidth class refers to the bandwidth configured to the UE. For example, even if a UE supports M MHz bandwidth, to support bandwidth adaptation of smaller bandwidth, it may be configured with M/2 or M/4 or M/8, etc. In other words, bandwidth adaptation may also occur based on the bandwidth class or supported bandwidths. Once bandwidth class is defined, the subband according to the assigned bandwidth class may be configured, and a UE may expect to receive control and/or data and/or RRM and/or RLF measurement. Resource allocation may also be done within that subband. If dynamic bandwidth adaptation can be achieved, resource allocation may also include {bandwidth class, subband index}. To minimize the ambiguity, one approach is to allow multiple entries which may be mapped to multiple bandwidth class and subband indices. For example, if UE bandwidth candidates are M, M/2, M/4, M/8, M/16, M/32, one value is mapped to M, two values are mapped to M/2, four values are mapped to M/4, and so on, where total of 64 entries may be mapped to different pairs of bandwidth class and subband index. Meanwhile, even though the subband shown in FIG. 19 is constructed in a non-overlapped manner, overlapped subband structure may also be considered in which the number of subband indices is increased.

If overlaid structure is used, search space candidate for CSS/GSS may be constructed so that for M/8 bandwidth case, P/8 candidates are mapped in each block/subband, and for M/4 bandwidth case, P/4 candidates are mapped in each block/subband, and so on. UEs supporting larger bandwidth may have larger candidates and a UE monitors all or subset of candidates which may be further configurable. For CSS and GSS, separate configuration per purpose of search space may also be considered. CSS may be configured within the minimum UE RF bandwidth frequency region, and GSS may be configured separately per each UE RF bandwidth for load balancing.

13. Handling Multiple RF Via UE-Perspective CA

For supporting wider bandwidth than maximum bandwidth supported by one RF, two approaches may be considered. One approach is to support one wideband carrier which can be realized by more than one RFs, and the other approach is to support multiple narrowband carriers and each carrier can be realized by multiple RFs. For the latter approach, further details are described above (10. Single data subband mapping with multiple RF). Here, the former approach is mainly focused on, in which a UE may be configured with multiple carriers and each carrier corresponds to one RF. UE-carrier based approach may be more efficient at least if a UE may operate with different numerology in each RF component.

In terms of carrier, the followings may be defined.

Though it may be configured to receive one TB over multiple carrier, as a baseline, a UE may expect that one TB is mapped within one carrier. If multiple carriers are configured, a UE may expect to receive multiple TBs via multiple RFs.

Separate HARQ process may be performed in each carrier. The soft buffer may be divided over multiple HARQ processes across multiple RFs.

At least one control resource set may be expected per carrier, and a UE may be configured with cross-carrier scheduling from one control resource set to schedule another carrier. Cross-carrier scheduling may be configured per each control resource set. In other words, even though a UE is configured with cross-carrier scheduling, depending on control resource set, cross-carrier scheduling and self-carrier scheduling may coexist, and cross-carrier scheduling may be supported by subset of control resource sets. Also, search space candidates may be restricted within control resource set for cross-carrier scheduling.

CSI feedback (and other feedback) may be reported per each carrier. Particularly, when wideband CQI is performed, independent wideband CQI may be performed within a carrier. Multiple wideband CQI may be transmitted when there are multiple RFs supporting multiple narrowband.

From UE perspective, single numerology may be assumed per carrier at least for data transmission. Different numerology may be used for control and other signals, such as synchronization signals.

To support the above description, the following approaches may be considered.

The network may configure multiple carriers and each carrier bandwidth may be equal to or smaller than the UE maximum RF bandwidth. To minimize the overhead, one or more carriers (contiguous intra-band carriers) may omit synchronization signals, PBCH, and RRM measurement RS, SIB, etc. Though synchronization signals/PBCH/SIB may not be transmitted periodically to support association as stand-alone cell, it may be possible to transmit synchronization signals/ PBCH/SIB (all or partial) to assist UE tracking and system information update. For PBCH and/or SIB transmission, a UE may retune to anchor subband where synchronization signals/PBCH are transmitted, regardless of monitoring frequency band. During acquiring synchronization signals/PBCH, a UE may skip receiving data or the UE receives/transmits control/data in the anchor subband while the UE is on the anchor subband. It may also be configured as a measurement gap to read synchronization signals and/or PBCH of the serving cell as well. Alternatively, if a UE monitors frequency band including anchor subband, the UE may acquire system information in the anchor subband. Otherwise, a UE may request update of the system information based on system update indication. Upon receiving the request, the network may transmit periodic or aperiodic or UE-specific or group-specific PBCH and/or SIB. This approach does not require a UE to retune for PBCH/SIB acquisition. Alternatively, the network may transmit PBCH/SIB in each subband upon SIB update so that all UEs can acquire PBCH/SIB without changing frequency location or separate operation.

A UE may be aggregated with one or multiple carriers, similar to current LTE CA.

Depending on UE bandwidth, within the same bandwidth or a set of PRBs, some UEs may be supported by single RF/single carrier whereas some UEs may be supported by multiple RFs/multiple carriers. In this case, single or multiple carriers may be configured to each UE from UE perspective. For a UE with multiple RF, it is handled as if multiple UEs with single RF is supported from the network perspective.

14. RRM Handling in Wideband

When a UE is configured with UE-specific bandwidth, handling of RRM measurement may follow one or more of the following options.

(1) Option 1

Figure 20:
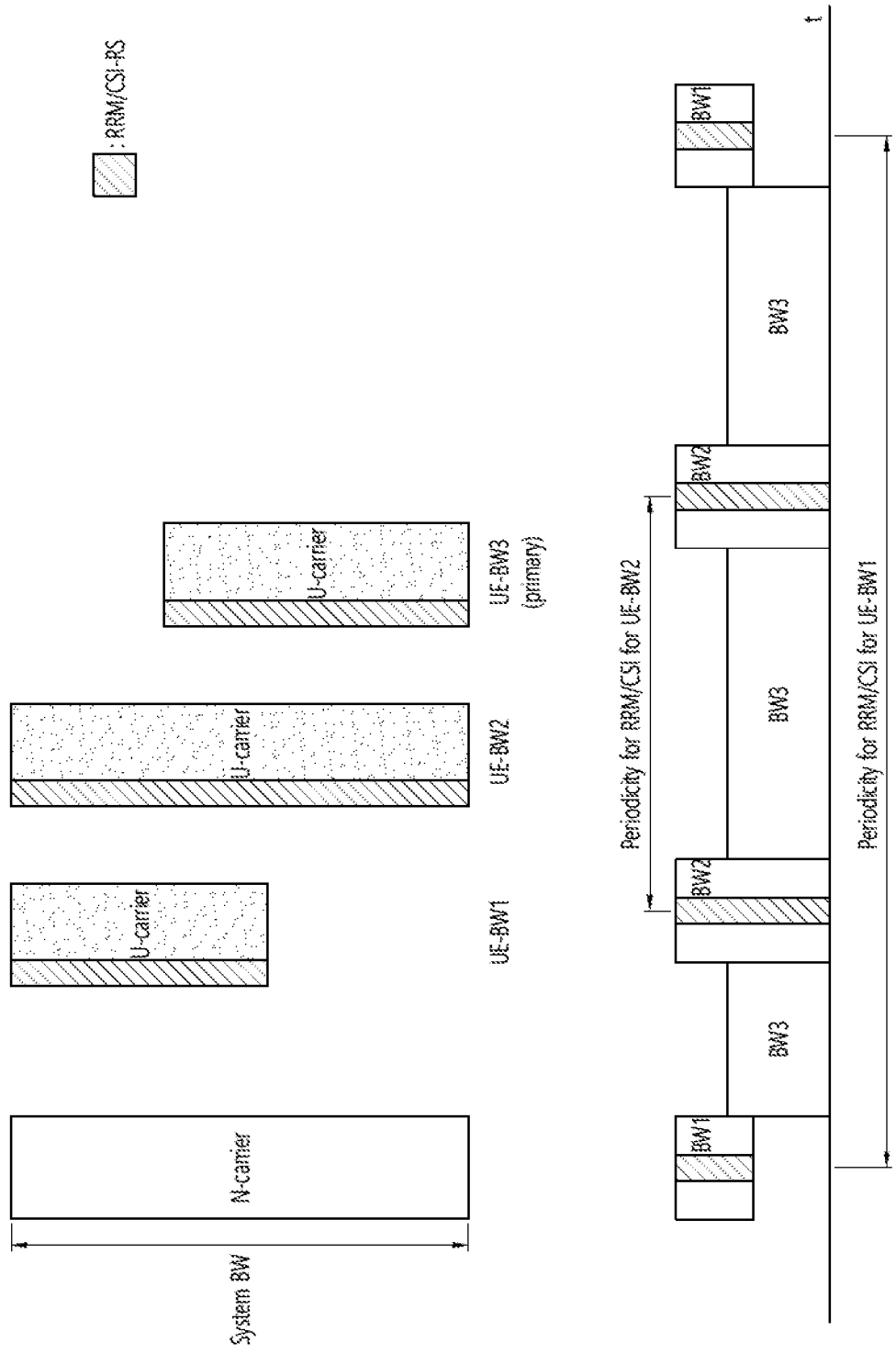
FIG. 20 shows an example of option 1 for RRM handling in wideband according to an embodiment of the present invention.

FIG. 20 shows an example of option 1 for RRM handling in wideband according to an embodiment of the present invention. According to option 1, measurement bandwidth follows UE-specific bandwidth and measurement bandwidth may be smaller or equal to UE-specific bandwidth. If measurement bandwidth is configured larger than UE-specific bandwidth, a UE may not be required to monitor or measure outside of its configured bandwidth. For option 1, the followings may be considered.

To support wideband RRM or RRM outside of its currently configured UE-specific bandwidth, one option is to configure multiple RRM configurations or separate RRM configuration per UE-specific bandwidth.

For each RRM configuration, periodicity and bandwidth of RRM measurement may be configured. Following periodicity configuration, a UE may switch its UE-specific bandwidth. Necessary frequency retuning gap may be added whenever frequency retuning occurs.

One of drawback of this option is to utilize second RF for measurement outside of configured UE-specific bandwidth. To measure different bandwidth, separate UE-specific bandwidth for second RF may be necessary. Alternatively, this may be applied only within a RF. If a UE indicates additional RF or a UE is equipped with additional RF, RF measurement on different frequency/ RRM bandwidth may be possible. To support this, the network may configure a list of frequency where SS block is transmitted and/or RRM-RS is transmitted. Alternatively, a list of frequency, bandwidth for RRM measurements may be configured to a UE if the network knows that the UE is equipped with additional RF.

When this option is used, measurement may occur on the same frequency range where control and data are also received. Whenever a UE switches its frequency, its control resource set configuration and resource allocation may be changed as well.

For L3-filter, separate RRM filter per UE-specific may be used, and different RRM results (as if they are multiple carriers) may be maintained. To determine whether to trigger any handover procedure, or inform the network, average value or best value or worst across multiple configurations may be selected. In this case, the selected value between neighbor cell and serving cell may be used for determining events/reports. Alternatively, when comparing results between serving cell and neighbor cell, the values from the same configuration may be used. To trigger event, it may follow either event is triggered at least one configuration triggers event or all configurations trigger the event. For example, if only one configuration shows that neighbor cell's quality is much better than that of serving cell, following the first approach, a UE may report its event. But following the second approach, a UE may not report its event.

(2) Option 2

Figure 21:
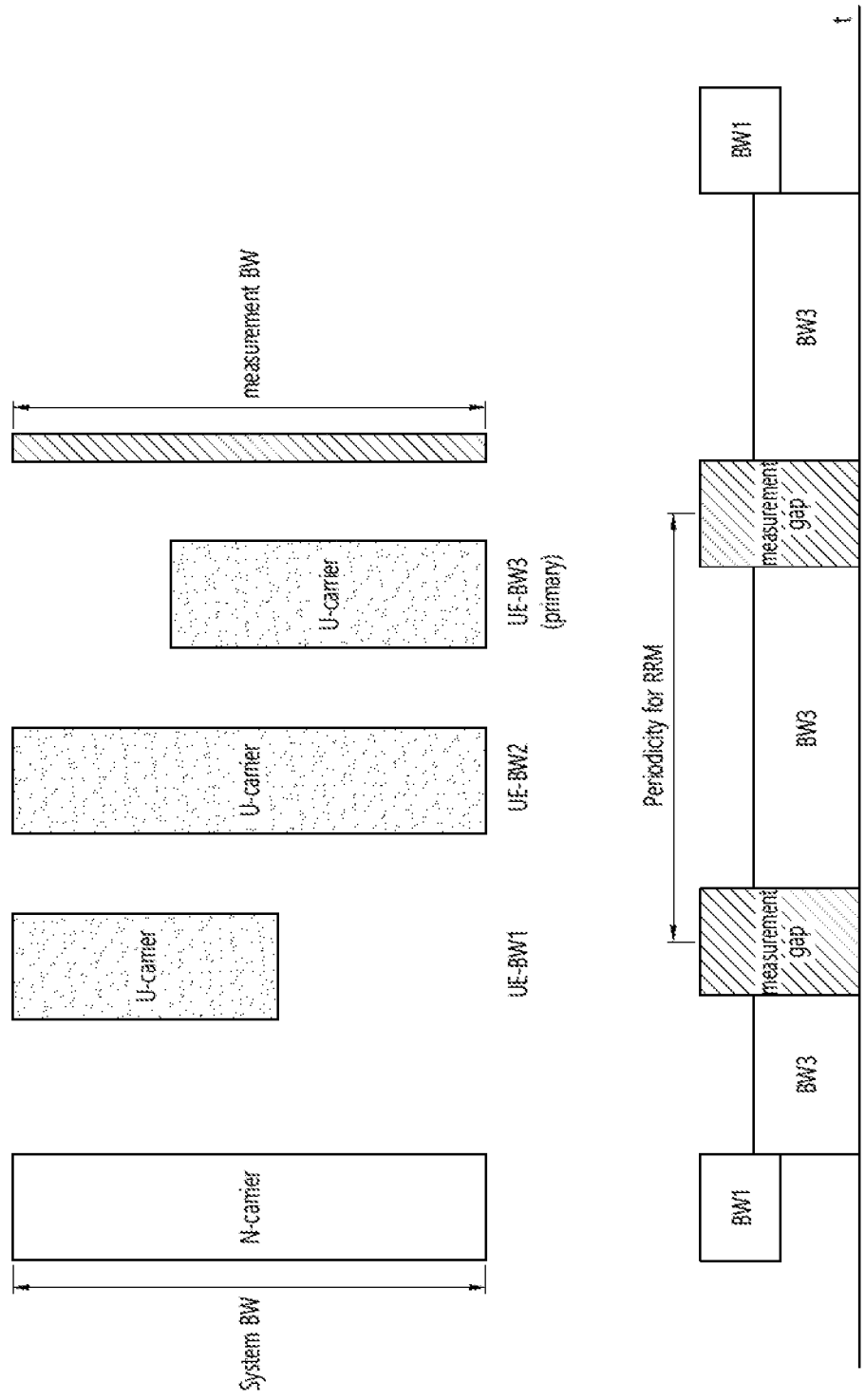
FIG. 21 shows an example of option 2 for RRM handling in wideband according to an embodiment of the present invention.

FIG. 21 shows an example of option 2 for RRM handling in wideband according to an embodiment of the present invention. According to option 2, a list of measurement bandwidth, frequency may be configured independently from UE-specific bandwidth. Whether a UE needs a measurement gap for such measurement or not may be informed to the network so that the network can configure necessary measurement gap. If RRM measurement does not require retuning, measurement gap may be omitted. Depending on BWP configuration, necessary gap may be created by the UE by not receiving/transmitting some control/data during the gap.

(3) Option 3

Figure 22:
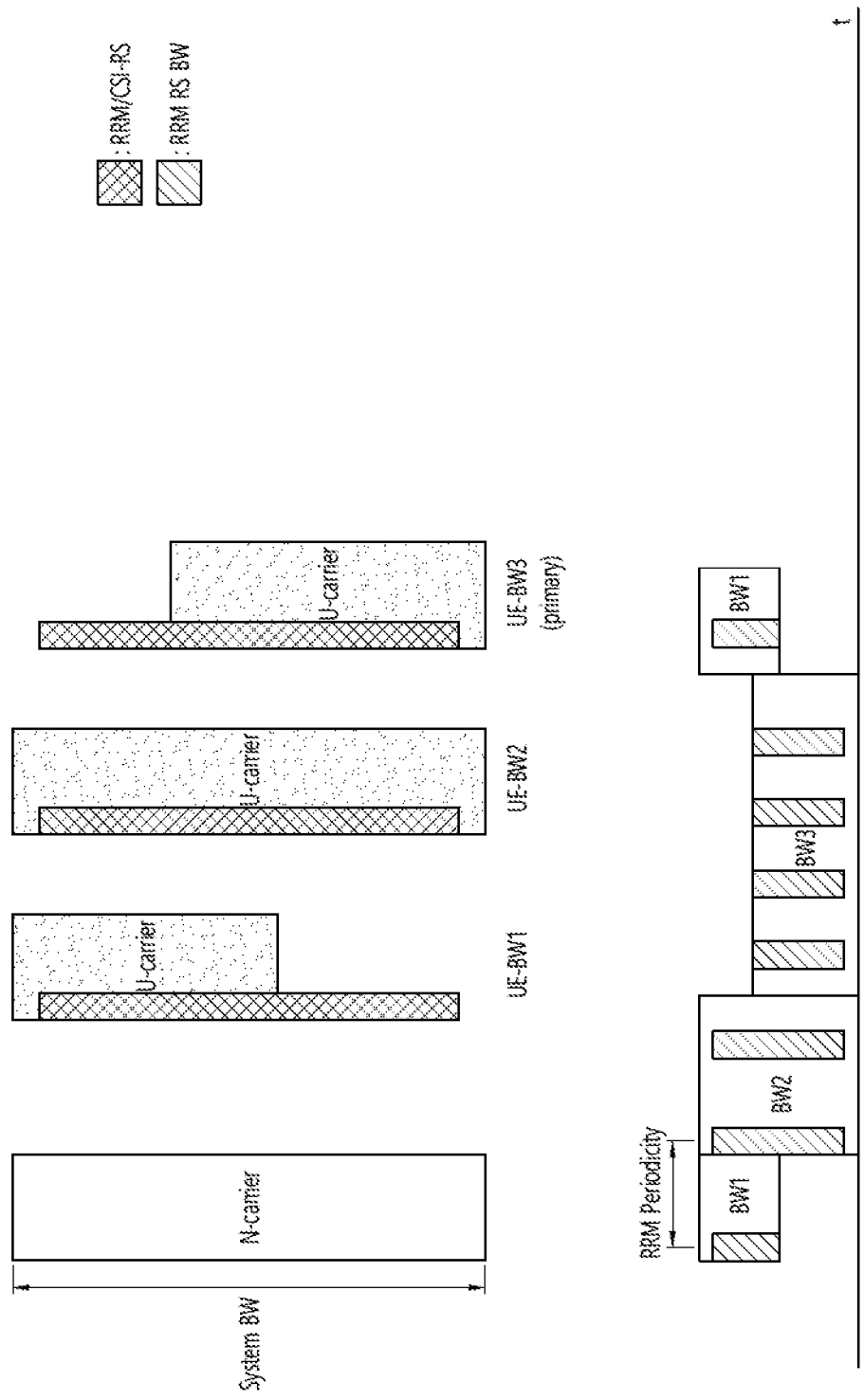
FIG. 22 shows an example of option 3 for RRM handling in wideband according to an embodiment of the present invention.

FIG. 22 shows an example of option 3 for RRM handling in wideband according to an embodiment of the present invention. According to option 3, a configuration of measurement RS, such as CSI-RS, may be configured larger than UE-specific bandwidth. The measurement may be done within UE-specific bandwidth based on bandwidth adaptation. However, measurement bandwidth may not exceed UE RF bandwidth. Additional measurement utilizing second RF may also be performed based on information on the list of SS block or a list of RRM frequency, bandwidth. In terms of RRM measurement, L3-filter may be shared among different bandwidth. In other words, RRM result may be averaged regardless of actual bandwidth of measurement. Alternatively, it may be notified to higher layer to reset RRM measurement results whenever bandwidth is changed. When this option is used, measurement on the same frequency location regardless of BWP change may be accumulated.

(4) Option 4: RRM measurement may occur on the smallest UE-specific bandwidth which may not be changed regardless of actual bandwidth adaptation.

RRM measurement on neighbor cell may be same as serving cell. Or, RRM measurement on neighbor cell may be separate from serving cell.

Meanwhile, when a UE changes its bandwidth, the following two approaches may be considered for RRM bandwidth.

(1) Independent configuration from BWP: Measurement bandwidth may be configured which is smaller or equal to UE RF bandwidth. If this approach is used, whenever a UE needs to perform measurement and the bandwidth may be larger than its currently configured BWP, the UE may change its RF bandwidth. When measurement is configured, periodicity and bandwidth of measurement RS may be configured.

(2) Dependent configuration on BWP: RRM measurement may be done within UE-configured frequency range (BWP) at a given time. Whenever a UE-configured frequency range changes, RRM measurement at L3-filter may be reset (if the measurement bandwidth or location is changed).

Figure 23:
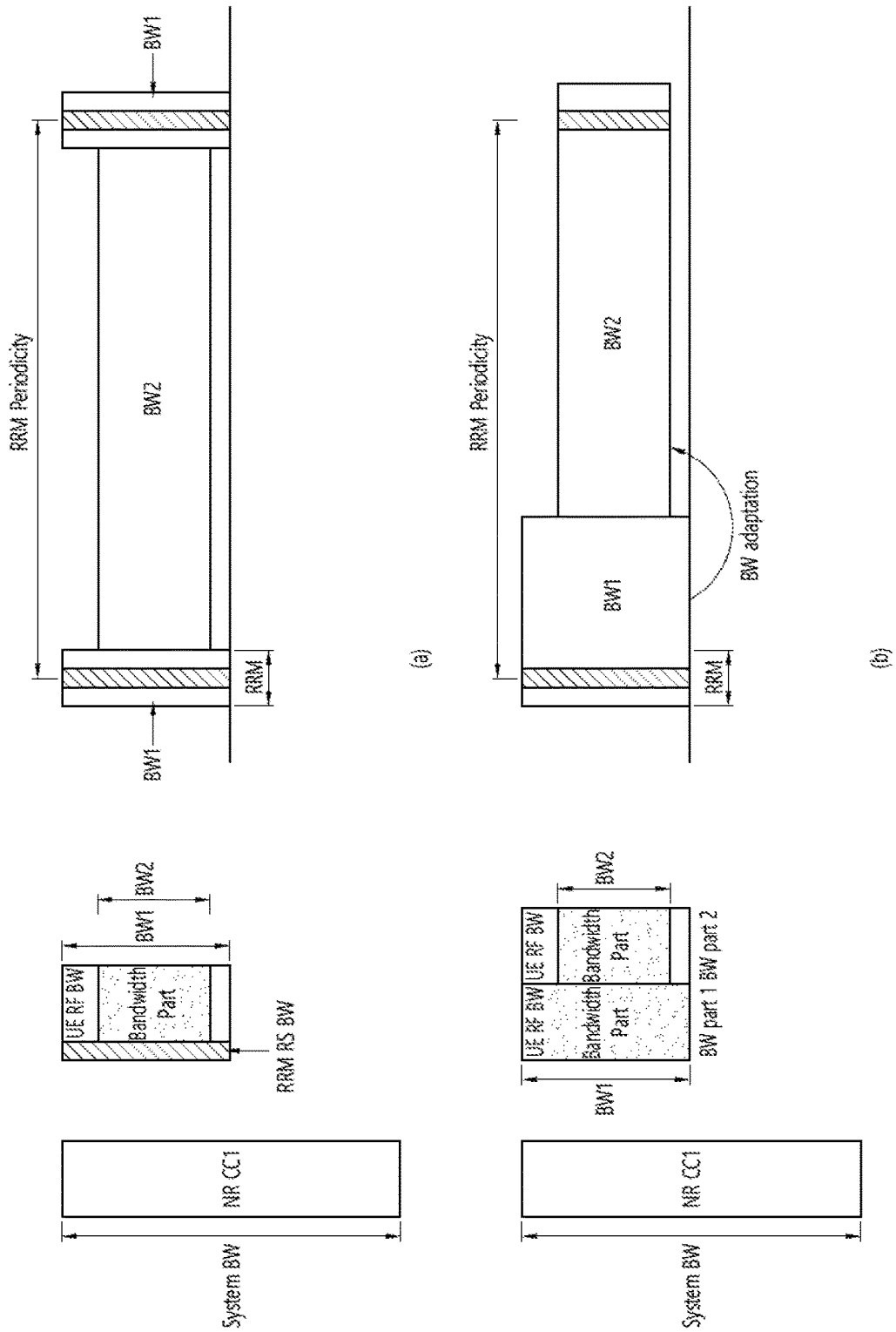
FIG. 23 shows an example of different RRM bandwidth options according to an embodiment of the present invention.

FIG. 23 shows an example of different RRM bandwidth options according to an embodiment of the present invention. FIG. 23-(a) shows an independent configuration from BWP, and FIG. 23-(b) shows a dependent configuration on BWP. Meanwhile, further considerations including RRM requirements may be considered to select between two category options.

When a UE is equipped with multiple RFs, before configuring additional UE-specific carrier, a UE may need to perform RRM measurement on frequency range outside of its currently active bandwidth within a NR carrier bandwidth. The potential benefit of RRM measurement on different frequency range in a NR carrier is that due to different interference level, a UE can search better frequency range among multiple candidates. For this, a UE may be configured with measurement configurations outside of its active bandwidth. Generally, this may also be supported for narrowband UEs with single RF, which may be done via measurement gap configuration or bandwidth adaptation.

15. CSI Handling in Wideband

In CSI feedback, at least wideband and subband CSI feedback may be considered. In terms of frequency bandwidth and location for wideband CSI, similar options to RRM handling may be considered.

(1) Option 1: Separate frequency and bandwidth information may be configured for wideband CSI feedback per UE-specific bandwidth. In terms of wideband CSI, average across CSI measurement based on the same UE-specific bandwidth or the same configuration may be assumed.

(2) Option 2: Wideband CSI bandwidth may be configured which may require some gap to perform measurement.

(3) Option 3: Wideband CSI may always be measured within UE-specific bandwidth. Wideband CSI results may be reset whenever a UE changes its bandwidth. Further, wideband CSI results may be averaged regardless of actual bandwidth.

For subband CSI, the following two approaches may be considered. One approach is to follow UE-specific bandwidth as a whole, then divide subband based on UE-specific bandwidth. The other approach is to follow system bandwidth as a whole, then divide subband based on system bandwidth.

If Option 1 is used and multiple CSI configurations are possible including potentially different bandwidth and frequency location, aperiodic CSI trigger may trigger one of CSI configurations. When aperiodic CSI is triggered outside of its current UE-specific bandwidth, a UE may adapt its bandwidth before CSI measurement. When Option 3 is used, CSI measurement may follow UE-specific bandwidth.

Similar to RRM measurement bandwidth, some clarification on wideband CSI feedback may be necessary. As the periodicity of CSI measurement is generally shorter than RRM measurement, it may not be efficient to configure separate configuration for wideband CSI feedback independent from BWP. As wideband CSI is mainly for data scheduling, it is generally desirable to align wideband CSI feedback bandwidth with the configured BWP. In other words, bandwidth of wideband CSI may be defined same as the UE BWP for UE-specific data. When UE BWP is changed, wideband CSI measurements may be reset. For subband CSI, it may be defined within its configured BWP.

For aperiodic CSI report or one-shot CSI report, to allow possible frequency retuning to better frequency for frequency selective scheduling, frequency location of CSI measurement may be indicated. If this is configured, necessary frequency retuning gap should be supported.

When BWP changes, for CSI measurement, if the measurement is accumulated per subband, this requires 'no' change or 'nested' structure of subband change so that previous measurement on a subband can be used for another subband in changed BWP.

It is also noted that similar approach to RRM or CSI may also be applied to radio link management (RLM) measurement. For example, RLM measurement may be performed within the configured data subband or control subband and average may be applied across different data or control subbands.

Figure 24:
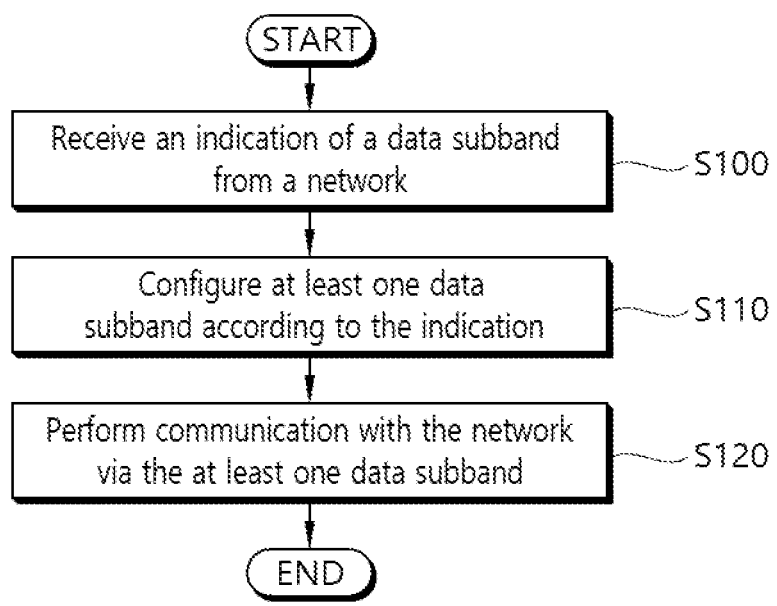
FIG. 24 shows a method for configuring a data subband by a UE according to an embodiment of the present invention.

FIG. 24 shows a method for configuring a data subband by a UE according to an embodiment of the present invention. The present described above may be applied to this embodiment.

In step S100, the UE receives an indication of a data subband from a network. In step S110, the UE configures at least one data subband according to the indication. In step S120, the UE performs communication with the network via the at least one data subband. One data subband consists of contiguous or non-contiguous PRBs.

At least one of a numerology used for data transmission, a slot length, a mini-slot length, a RAT or a maximum TBS may be defined per data subband. The at least one data subband may be configured in a UE-specific carrier. The UE-specific carrier may be configured per RF. The at least one data subband may be configured across multiple UE-specific carriers. The data subband may include a common data subband for a common data. At most one common data subband may be configured for the common data.

The at least one data subband may be scheduled by a control subband. At least one of a numerology used for control transmission, a monitoring interval or REG/CCE index within the control subband may be defined per control subband. The control subband may be configured in an anchor subband.

A number of PRBs within a UE supported bandwidth may be used for resource allocation of the at least one data subband. Or, a maximum number of PRBs configured to the data subband may be used for resource allocation of the at least one data subband.

The UE may further perform RRM measurement on one or multiple subbands when the network configures one wideband carrier. In this case each subband may carry a SS block. Or, only anchor subband may carry a SS block. Alternatively, the UE may perform RRM measurement on one or multiple carriers when the network configures multiple narrowband carriers.

Figure 25:
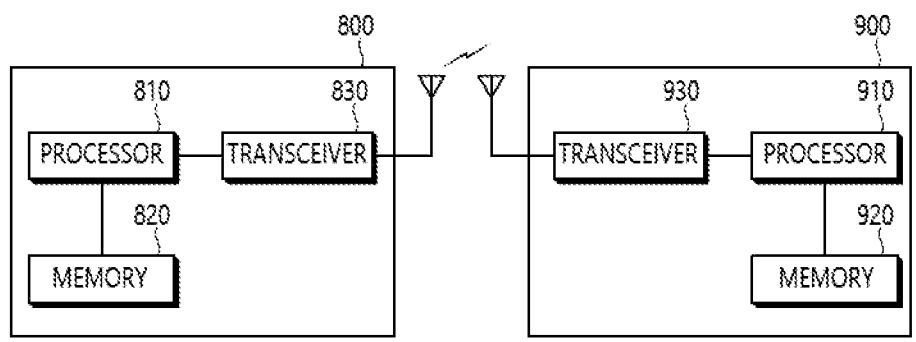
FIG. 25 shows a wireless communication system to implement an embodiment of the present invention.

FIG. 25 shows a wireless communication system to implement an embodiment of the present invention.

A network node 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a wireless device, comprising:
receiving a configuration for a plurality of bandwidth parts (BWPs), wherein the configuration includes information for a numerology for each of the plurality of BWPs;
receiving a first downlink control information (DCI) including information for a first BWP among the plurality of BWPs;
activating the first BWP based on the information for the first BWP;
performing at least one of a reception or a transmission in the activated first BWP based on a numerology for the first BWP;
receiving a second DCI including information for a second BWP among the plurality of BWPs;
activating the second BWP by performing a BWP switching to the second BWP based on the information for the second BWP; and
performing at least one of a reception or a transmission in the activated second BWP based on a numerology for the second BWP.

2. The method of claim 1, wherein each of the plurality of BWPs consists of contiguous or non-contiguous physical resource blocks (PRBs).

3. The method of claim 1, wherein the second BWP is different from the first BWP.

4. The method of claim 1, wherein at least one of the first BWP or the second BWP is configured in a UE-specific carrier.

5. The method of claim 1, wherein at least one of a numerology used for data reception or transmission, a slot length, a mini-slot length, a radio access technology (RAT), or a maximum transport block size (TBS) is defined for each of the plurality of BWPs.

6. The method of claim 1, further comprising performing channel state information (CSI) measurement within at least one of the first BWP or the second BWP.

7. The method of claim 1, wherein the wireless device is in communication with at least one of a mobile device, a network, or autonomous vehicles other than the wireless device.

8. A wireless device comprising:
a memory;
a transceiver; and
at least one processor
operably coupled to the memory and the transceiver,
wherein the memory stores instructions that, based on being executed by the at least one processor, perform operations comprising:
receiving a configuration for a plurality of bandwidth parts (BWPs), wherein the configuration includes information for a numerology for each of the plurality of BWPs;
receiving a first downlink control information (DCI) including information for a first BWP among the plurality of BWPs;
activating the first BWP based on the information for the first BWP;
performing at least one of a reception or a transmission in the activated first BWP based on a numerology for the first BWP;
receiving a second DCI including information for a second BWP among the plurality of BWPs;
activating the second BWP by performing a BWP switching to the second BWP based on the information for the second BWP; and
performing at least one of a reaction or a transmission in the activated second BWP based on a numerology for the second BWP.

9. The wireless device of claim 8, wherein each of the plurality of BWPs consists of contiguous or non-contiguous physical resource blocks (PRBs).

10. The wireless device of claim 8, wherein the second BWP is different from the first BWP.

11. The wireless device of claim 8, wherein at least one of the first BWP or the second BWP is configured in a UE-specific carrier.

12. The wireless device of claim 8, wherein at least one of a numerology used for data reception or transmission, a slot length, a mini-slot length, a radio access technology (RAT), or a maximum transport block size (TBS) is defined for each of the plurality of BWPs.

13. The wireless device of claim 8, wherein the operations further comprise performing channel state information (CSI) measurement within at least one of the first BWP or the second BWP.

14. A processing apparatus configured to operate a wireless device in a wireless communication system, the processing apparatus comprising:
   at least one processor; and
   at least one memory operably coupled to the at least one processor,
   wherein the at least one processor is configured to perform operations comprising:
      receiving a configuration for a plurality of bandwidth parts (BWPs), wherein the configuration includes information for a numerology for each of the plurality of BWPs;
      receiving a first downlink control information (DCI) including information for a first BWP among the plurality of BWPs;
      activating the first BWP based on the information for the first BWP;
      performing at least one of a reception or a transmission in the activated first BWP based on a numerology for the first BWP;
      receiving a second DCI including information for a second BWP among the plurality of BWPs;
      activating the second BWP by performing a BWP switching to the second BWP based on the information for the second BWP; and
      performing at least one of a reception or a transmission in the activated second BWP based on a numerology for the second BWP.

15. The processing apparatus of claim 14, wherein each of the plurality of BWPs consists of contiguous or non-contiguous physical resource blocks (PRBs).

16. The processing apparatus of claim 14, wherein the second BWP is different from the first BWP.

17. The processing apparatus of claim 14, wherein at least one of the first BWP or the second BWP is configured in a UE-specific carrier.

18. The processing apparatus of claim 14, wherein at least one of a numerology used for data reception or transmission, a slot length, a mini-slot length, a radio access technology (RAT) or a maximum transport block size (TBS) is defined for each of the plurality of BWPs.

19. The processing apparatus of claim 14, wherein the operations further comprise performing channel state information (CSI) measurement within at least one of the first BWP or the second BWP.

* * * * *